(12) United States Patent
Wei et al.

(10) Patent No.: US 10,931,732 B2
(45) Date of Patent: Feb. 23, 2021

(54) MULTIMEDIA FILE TRANSMISSION APPARATUS AND METHOD

(71) Applicant: Huawei Technologies Co., Ltd., Shenzhen (CN)

(72) Inventors: He Wei, Shenzhen (CN); Shanxi Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 362 days.

(21) Appl. No.: 15/289,545

(22) Filed: Oct. 10, 2016

(65) Prior Publication Data

US 2017/0026457 A1   Jan. 26, 2017

Related U.S. Application Data

(63) Continuation of application No. PCT/CN2015/073410, filed on Feb. 28, 2015.

(30) Foreign Application Priority Data

Apr. 24, 2014 (CN) .......................... 201410168541.5

(51) Int. Cl.
H04L 29/08 (2006.01)
G06F 16/44 (2019.01)
(Continued)

(52) U.S. Cl.
CPC ............ *H04L 67/06* (2013.01); *G06F 16/183* (2019.01); *G06F 16/44* (2019.01);
(Continued)

(58) Field of Classification Search
CPC ..... H04L 67/06; H04L 43/0876; H04L 65/80; G06F 17/30058; G06F 17/30203;
(Continued)

(56) References Cited

U.S. PATENT DOCUMENTS 6,085,253 A * 7/2000 Blackwell .............. H04L 47/14
709/235
7,114,002 B1 * 9/2006 Okumura .............. H04L 1/1809
370/352
(Continued)

FOREIGN PATENT DOCUMENTS

CN       101207783 A      6/2008
CN       101222296 A      7/2008
(Continued)

OTHER PUBLICATIONS

Machine Translation and Abstract of Chinese Publication No. CN101207783, Jun. 25, 2008, 6 pages.
(Continued)

*Primary Examiner* — Glenton B Burgess
*Assistant Examiner* — Rachel J Hackenberg
(74) *Attorney, Agent, or Firm* — Conley Rose, P.C.

(57) ABSTRACT

A multimedia file transmission method, which relates to the fields of data transmission and image processing, includes acquiring network information; determining a transmission version of a multimedia file according to the network information, where different transmission versions are corresponding to different multimedia file quality; and transmitting the multimedia file according to the transmission version. The network information is automatically acquired, and the transmission version of the multimedia file is automatically determined according to the network information, which not only saves an operation of manually selecting, by a user, a transmission version and reduces operation complexity, but also improves appropriateness of determining a transmission version.

33 Claims, 10 Drawing Sheets

(51) Int. Cl.
*G06F 16/182* (2019.01)
*H04N 21/24* (2011.01)
*H04L 29/06* (2006.01)
*H04N 21/2343* (2011.01)
*H04N 21/20* (2011.01)
*H04N 21/2662* (2011.01)
*H04L 12/26* (2006.01)

(52) U.S. Cl.
CPC .......... *H04L 43/0876* (2013.01); *H04L 65/80* (2013.01); *H04N 21/20* (2013.01); *H04N 21/23439* (2013.01); *H04N 21/2402* (2013.01); *H04N 21/2662* (2013.01)

(58) Field of Classification Search
CPC ............. H04N 21/20; H04N 21/23439; H04N 21/2402; H04N 21/2662
See application file for complete search history.

(56) References Cited

U.S. PATENT DOCUMENTS

| | | | | |
|---|---|---|---|---|
| 8,379,083 | B1* | 2/2013 | Jafari | H04N 7/185 348/143 |
| 9,356,821 | B1* | 5/2016 | Jagannathan | H04L 29/08144 |
| 2008/0040501 | A1* | 2/2008 | Harrang | H04L 1/0002 709/232 |
| 2008/0288977 | A1* | 11/2008 | Howcroft | H04N 21/64322 725/37 |
| 2011/0055882 | A1* | 3/2011 | Ohya | H04N 21/23439 725/93 |
| 2011/0122939 | A1* | 5/2011 | Ganesan | H04N 19/115 375/240.01 |
| 2011/0149967 | A1 | 6/2011 | Chen et al. | |
| 2014/0115647 | A1* | 4/2014 | Kim | H04N 21/4307 725/110 |
| 2014/0189064 | A1* | 7/2014 | Cilli | H04N 21/85406 709/219 |
| 2014/0282689 | A1* | 9/2014 | Kummer | H04N 21/2393 725/31 |
| 2014/0310386 | A1* | 10/2014 | Srinivasan | H04L 65/605 709/219 |
| 2015/0074232 | A1* | 3/2015 | Phillips | H04L 65/604 709/219 |

FOREIGN PATENT DOCUMENTS

| | | |
|---|---|---|
| CN | 101232390 A | 7/2008 |
| CN | 101765003 A | 6/2010 |
| CN | 102065491 A | 5/2011 |
| CN | 102075312 A | 5/2011 |
| CN | 101340575 B | 4/2012 |
| CN | 101572740 B | 7/2012 |
| CN | 103986696 A | 8/2014 |

OTHER PUBLICATIONS

Machine Translation and Abstract of Chinese Publication No. CN101340575, Apr. 18, 2012, 11 pages.
Machine Translation and Abstract of Chinese Publication No. CN101572740, Jul. 18, 2012, 2 pages.
Machine Translation and Abstract of Chinese Publication No. CN101765003, Jun. 30, 2010, 4 pages.
Machine Translation and Abstract of Chinese Publication No. CN102065491, May 18, 2011, 3 pages.
Machine Translation and Abstract of Chinese Publication No. CN103986696, Part 1, Aug. 13, 2014, 18 pages.
Machine Translation and Abstract of Chinese Publication No. CN103986696, Part 2, Aug. 13, 2014, 6 pages.
Foreign Communication From a Counterpart Application, PCT Application No. PCT/CN2015/073410, English Translation of International Search Report dated Jun. 5, 2015, 2 pages.
Foreign Communication From a Counterpart Application, PCT Application No. PCT/CN2015/073410, English Translation of Written Opinion dated Jun. 5, 2015, 8 pages.

\* cited by examiner

MULTIMEDIA FILE TRANSMISSION APPARATUS AND METHOD

CROSS-REFERENCE TO RELATED APPLICATIONS

This application is a continuation of International Application No. PCT/CN2015/073410, filed on Feb. 28, 2015, which claims priority to Chinese Patent Application No. 201410168541.5, filed on Apr. 24, 2014. The disclosures of the aforementioned applications are hereby incorporated by reference in their entireties.

TECHNICAL FIELD

The present disclosure relates to the fields of data transmission and image processing, and in particular, to a multimedia file transmission apparatus and method.

BACKGROUND

With the continuous development of communications technologies and Internet technologies, people are already accustomed to sharing information such as their moods, moments, and locations with others. A multimedia file such as a picture or a short video is definitely a visual and colorful presentation form.

A user may upload a multimedia file in an electronic device such as a mobile phone, a tablet computer, or a computer to a social platform for downloading by other users, or may directly transmit a multimedia file to a device of another user. In a process of transmitting a multimedia file, multimedia file quality relates directly to a transmission time of the multimedia file. For a same multimedia file, a transmission time that needs to be consumed in transmitting a high-quality version is usually longer than a transmission time that needs to be consumed in transmitting a low-quality version, and meanwhile, traffic that needs to be consumed in transmitting a high-quality version is also larger.

In related technologies, two multimedia file transmission modes are usually provided to a user for selection. One is that a high-quality version of a multimedia file is transmitted, for example, an original multimedia file is transmitted; the other is that a low-quality version of a multimedia file is transmitted, for example, an original multimedia file is transmitted after being compressed. The user may preset the multimedia file transmission mode. After the user determines to transmit a multimedia file, an electronic device determines, according to the multimedia file transmission mode preset by the user, whether to adjust multimedia file quality, and then transmits the multimedia file; or after the user determines to transmit a multimedia file, an electronic device prompts the user to select a multimedia file transmission mode, and the electronic device determines, according to the multimedia file transmission mode selected by the user, whether to adjust multimedia file quality, and then transmits the multimedia file.

In a process of implementing the present disclosure, it is found that the following problem exists in the foregoing technologies. A decision on whether to adjust multimedia file quality before an electronic device transmits a multimedia file relies on user's selection; the user's selection is usually based on only an individual preference but a current transmission condition is ignored. For example, the user presets that a multimedia file is transmitted in a high-quality version, and if the multimedia file is still transmitted in the high-quality version in a case in which a network environment is relatively poor, a charging network is used, or an extra data volume of a package needs to be used, transmission efficiency is affected, and a communication tariff is consumed. Therefore, a problem that selection of a multimedia file quality version is not appropriate exists in a multimedia file transmission solution involved in related technologies.

SUMMARY

To resolve a problem, existing in a multimedia file transmission solution involved in related technologies, that selection of a multimedia file quality version is not appropriate, the disclosed embodiments provide a multimedia file transmission apparatus and method. The technical solutions are as follows.

According to a first aspect, a multimedia file transmission apparatus is provided, where the apparatus includes an information acquiring module configured to acquire network information; a transmission determining module configured to determine a transmission version of a multimedia file according to the network information, where different transmission versions are corresponding to different multimedia file quality; and a file transmission module configured to transmit the multimedia file according to the transmission version.

In a first possible implementation manner of the first aspect, the transmission determining module includes a limit calculation unit and a first determining unit; or a limit determining unit and a first determining unit; or a network determining unit and a second determining unit; where the limit calculation unit is configured to, if the network information is network status information, calculate a file size limit for current transmission according to the network status information; and the first determining unit is configured to determine the transmission version of the multimedia file according to the file size limit for current transmission; the limit determining unit is configured to, if the network information is a peer end restrictive condition, determine a file size limit for current transmission according to the peer end restrictive condition; and the first determining unit is configured to determine the transmission version of the multimedia file according to the file size limit for current transmission; and the network determining unit is configured to, if the network information is network type information, determine, according to the network type information, whether a current network is a free network; and the second determining unit is configured to determine the transmission version of the multimedia file according to whether the current network is a free network.

With reference to the first possible implementation manner of the first aspect, in a second possible implementation manner, the limit calculation unit includes a time acquiring subunit and a limit calculation subunit; where the time acquiring subunit is configured to acquire a transmission time limit, where the transmission time limit is set by a system or set by a user; and the limit calculation subunit is configured to calculate the file size limit for current transmission according to the transmission time limit and the network status information.

With reference to the first possible implementation manner of the first aspect, in a third possible implementation manner, the first determining unit includes a high-quality judging subunit, a high-quality determining subunit, a high-quality processing subunit, and a first determining subunit; where the high-quality judging subunit is configured to determine whether a file size of a highest-quality version of the multimedia file is greater than the file size limit for current transmission; the high-quality determining subunit is configured to, if it is determined that the file size of the highest-quality version of the multimedia file is less than the file size limit for current transmission, determine the highest-quality version of the multimedia file as the transmission version of the multimedia file; and the high-quality processing subunit is configured to, if it is determined that the file size of the highest-quality version of the multimedia file is greater than the file size limit for current transmission, process the highest-quality version of the multimedia file according to the file size limit for current transmission to obtain a first target quality version; and the first determining subunit is configured to determine the first target quality version as the transmission version of the multimedia file, where a file size of the first target quality version is less than or equal to the file size limit for current transmission.

With reference to the first possible implementation manner of the first aspect, in a fourth possible implementation manner, the limit determining unit includes a limit determining subunit; or a parameter determining subunit; or an association determining subunit; where the limit determining subunit is configured to, when the peer end restrictive condition includes a file size limit, read the file size limit from the peer end restrictive condition, and determine the read file size limit as the file size limit for current transmission; the parameter determining subunit is configured to, when the peer end restrictive condition includes a multimedia file parameter limit, read the multimedia file parameter limit from the peer end restrictive condition, and determine the file size limit for current transmission according to the multimedia file parameter limit, where the multimedia file parameter limit includes at least one of a definition limit, a resolution limit, a saturation limit, and a brightness limit; and the association determining subunit is configured to, when the peer end restrictive condition includes peer end user association information, read the peer end user association information from the peer end restrictive condition, and determine the file size limit for current transmission according to the peer end user association information.

With reference to the first possible implementation manner of the first aspect, in a fifth possible implementation manner, the second determining unit includes a free determining subunit and a charging determining subunit, where the free determining subunit is configured to, if the current network is a free network, determine a highest-quality version of the multimedia file as the transmission version of the multimedia file; and the charging determining subunit is configured to, if the current network is not a free network, process the highest-quality version of the multimedia file according to a preset multimedia file quality parameter to obtain a second target quality version, and determine the second target quality version as the transmission version of the multimedia file; or acquire remaining package data volume of the current network, determine a file size limit for current transmission according to the remaining package data volume, and determine the transmission version of the multimedia file according to the file size limit for current transmission.

With reference to the first aspect, the first possible implementation manner of the first aspect, the second possible implementation manner of the first aspect, the third possible implementation manner of the first aspect, the fourth possible implementation manner of the first aspect, or the fifth possible implementation manner of the first aspect, in a sixth possible implementation manner, the apparatus further includes an information re-acquiring module configured to, when the transmission version is not the highest-quality version of the multimedia file, re-acquire network information; a retransmission determining module configured to, if the re-acquired network information is better than the initially acquired network information, determine a retransmission version of the multimedia file according to the re-acquired network information, where multimedia file quality corresponding to the retransmission version is higher than multimedia file quality corresponding to the transmission version; and a file retransmission module configured to retransmit the multimedia file according to the retransmission version.

With reference to the sixth possible implementation manner of the first aspect, in a seventh possible implementation manner, the apparatus further includes a network detection module configured to detect whether the re-acquired network information is better than the initially acquired network information.

With reference to the seventh possible implementation manner of the first aspect, in an eighth possible implementation manner, the network detection module includes a first detection unit; or a second detection unit; or a third detection unit; where the first detection unit is configured to, if both the re-acquired network information and the initially acquired network information are the network status information, detect whether an extent to which the re-acquired network status information is better than the initially acquired network status information exceeds a first preset threshold; the second detection unit is configured to, if both the re-acquired network information and the initially acquired network information are the peer end restrictive conditions, compare the re-acquired peer end restrictive condition with the initially acquired peer end restrictive condition, and if a result of a comparison between the peer end restrictive conditions meets a first preset condition, determine that the re-acquired network information is better than the initially acquired network information, where the first preset condition includes that the peer end restrictive condition changes from a restricted state to a restriction released state or changes from a restricted state to a restriction relaxed state; and the third detection unit is configured to, if both the re-acquired network information and the initially acquired network information are the network type information, compare the re-acquired network type information with the initially acquired network type information, and if a result of a comparison between the network type information meets a second preset condition, determine that the re-acquired network information is better than the initially acquired network information, where the second preset condition includes that a charging network changes to a free network or the remaining package data volume is greater than a second preset threshold.

With reference to the sixth possible implementation manner of the first aspect, in a ninth possible implementation manner, the retransmission determining module includes a limit recalculation unit and a first retransmission unit; or a limit redetermining unit and the first retransmission unit; or a network redetermining unit and a second retransmission unit; where the limit recalculation unit is configured to, if the network information is network status information, calculate a file size limit for retransmission according to the network status information; and the first retransmission unit is configured to determine the retransmission version of the multimedia file according to the file size limit for retransmission; the limit redetermining unit is configured to, if the network information is a peer end restrictive condition, determine a file size limit for retransmission according to the peer end restrictive condition; and the first retransmission unit is configured to determine the retransmission version of the multimedia file according to the file size limit for retransmission; and the network redetermining unit is configured to, if the network information is network type information, determine, according to the network type information, whether a current network is a free network; and the second retransmission unit is configured to determine the retransmission version of the multimedia file according to whether the current network is a free network.

With reference to the ninth possible implementation manner of the first aspect, in a tenth possible implementation manner, the limit recalculation unit includes a transmission acquiring subunit and a limit recalculation subunit; where the transmission acquiring subunit is configured to acquire a transmission time limit, where the transmission time limit is set by a system or set by a user; and the limit recalculation subunit is configured to calculate the file size limit for retransmission according to the transmission time limit and the network status information.

With reference to the ninth possible implementation manner of the first aspect, in an eleventh possible implementation manner, the first retransmission unit includes a highest judging subunit, a highest determining subunit, a highest processing subunit, and a third determining subunit; where the highest judging subunit is configured to determine whether the file size of the highest-quality version of the multimedia file is greater than the file size limit for retransmission; the highest determining subunit is configured to, if it is determined that the file size of the highest-quality version of the multimedia file is less than the file size limit for retransmission, determine the highest-quality version of the multimedia file as the retransmission version of the multimedia file; and the highest processing subunit is configured to, if it is determined that the file size of the highest-quality version of the multimedia file is greater than the file size limit for retransmission, process the highest-quality version of the multimedia file according to the file size limit for retransmission to obtain a third target quality version; and the third determining subunit is configured to determine the third target quality version as the retransmission version of the multimedia file, where a file size of the third target quality version is less than or equal to the file size limit for retransmission, and multimedia file quality of the third target quality version is higher than multimedia file quality of the first target quality version.

With reference to the ninth possible implementation manner of the first aspect, in a twelfth possible implementation manner, the limit redetermining unit includes a limit redetermining subunit; or a parameter redetermining subunit; or an association redetermining subunit; where the limit redetermining subunit is configured to, when the peer end restrictive condition includes a file size limit, read the file size limit from the peer end restrictive condition, and determine the read file size limit as the file size limit for retransmission; the parameter redetermining subunit is configured to, when the peer end restrictive condition includes a multimedia file parameter limit, read the multimedia file parameter limit from the peer end restrictive condition, and determine the file size limit for retransmission according to the multimedia file parameter limit, where the multimedia file parameter limit includes at least one of a definition limit, a resolution limit, a saturation limit, and a brightness limit; and the association redetermining subunit is configured to, when the peer end restrictive condition includes peer end user association information, read the peer end user association information from the peer end restrictive condition, and determine the file size limit for retransmission according to the peer end user association information.

With reference to the ninth possible implementation manner of the first aspect, in a thirteenth possible implementation manner, the second retransmission unit includes a free retransmission subunit and a charging retransmission subunit, where the free retransmission subunit is configured to, if the current network is a free network, determine the highest-quality version of the multimedia file as the retransmission version of the multimedia file; and the charging retransmission subunit is configured to, if the current network is not a free network, process the highest-quality version of the multimedia file according to a preset multimedia file quality parameter to obtain a fourth target quality version, and determine the fourth target quality version as the retransmission version of the multimedia file, where multimedia file quality of the fourth target quality version is higher than multimedia file quality of the second target quality version; or acquire remaining package data volume of the current network, determine a file size limit for retransmission according to the remaining package data volume, and determine the retransmission version of the multimedia file according to the file size limit for retransmission.

With reference to the sixth possible implementation manner of the first aspect, in a fourteenth possible implementation manner, the apparatus further includes an identifier setting module configured to, when the transmission version is not the highest-quality version of the multimedia file, set and record a corresponding retransmission identifier for the multimedia file; and an identifier detection module configured to detect whether there is, at a local end, a multimedia file for which the retransmission identifier is set; where the information re-acquiring module is further configured to, if it is detected that there is a multimedia file for which the retransmission identifier is set, perform the step of re-acquiring network information.

With reference to the first aspect, the first possible implementation manner of the first aspect, the second possible implementation manner of the first aspect, the third possible implementation manner of the first aspect, the fourth possible implementation manner of the first aspect, or the fifth possible implementation manner of the first aspect, in a fifteenth possible implementation manner, the apparatus further includes a first prompting module configured to, when the transmission version is not the highest-quality version of the multimedia file, generate first prompt information, where the first prompt information is used to indicate that the transmission version is not the highest-quality version of the multimedia file; and/or a second prompting module configured to, when the transmission version is the highest version of the multimedia file, generate second prompt information, where the second prompt information is used to indicate that the transmission version is the highest-quality version of the multimedia file.

With reference to the sixth possible implementation manner of the first aspect, in a sixteenth possible implementation manner, the apparatus further includes a third prompting module configured to generate third prompt information, where the third prompt information is used to indicate that the multimedia file quality of the retransmission version is higher than the multimedia file quality of the transmission version.

According to a second aspect, a multimedia file transmission method is provided, where the method includes acquiring network information; determining a transmission version of a multimedia file according to the network information, where different transmission versions are corresponding to different multimedia file quality; and transmitting the multimedia file according to the transmission version.

In a first possible implementation manner of the second aspect, the determining a transmission version of a multimedia file according to the network information includes, if the network information is network status information, calculating a file size limit for current transmission according to the network status information, and determining the transmission version of the multimedia file according to the file size limit for current transmission; or if the network information is a peer end restrictive condition, determining a file size limit for current transmission according to the peer end restrictive condition, and determining the transmission version of the multimedia file according to the file size limit for current transmission; or if the network information is network type information, determining, according to the network type information, whether a current network is a free network, and determining the transmission version of the multimedia file according to whether the current network is a free network.

With reference to the first possible implementation manner of the second aspect, in a second possible implementation manner, the calculating a file size limit for current transmission according to the network status information includes acquiring a transmission time limit, where the transmission time limit is set by a system or set by a user; and calculating the file size limit for current transmission according to the transmission time limit and the network status information.

With reference to the first possible implementation manner of the second aspect, in a third possible implementation manner, the determining the transmission version of the multimedia file according to the file size limit for current transmission includes determining whether a file size of a highest-quality version of the multimedia file is greater than the file size limit for current transmission; if it is determined that the file size of the highest-quality version of the multimedia file is less than the file size limit for current transmission, determining the highest-quality version of the multimedia file as the transmission version of the multimedia file; and if it is determined that the file size of the highest-quality version of the multimedia file is greater than the file size limit for current transmission, processing the highest-quality version of the multimedia file according to the file size limit for current transmission to obtain a first target quality version, and determining the first target quality version as the transmission version of the multimedia file, where a file size of the first target quality version is less than or equal to the file size limit for current transmission.

With reference to the first possible implementation manner of the second aspect, in a fourth possible implementation manner, the determining a file size limit for current transmission according to the peer end restrictive condition includes, when the peer end restrictive condition includes a file size limit, reading the file size limit from the peer end restrictive condition, and determining the read file size limit as the file size limit for current transmission; or when the peer end restrictive condition includes a multimedia file parameter limit, reading the multimedia file parameter limit from the peer end restrictive condition, and determining the file size limit for current transmission according to the multimedia file parameter limit, where the multimedia file parameter limit includes at least one of a definition limit, a resolution limit, a saturation limit, and a brightness limit; or when the peer end restrictive condition includes peer end user association information, reading the peer end user association information from the peer end restrictive condition, and determining the file size limit for current transmission according to the peer end user association information.

With reference to the first possible implementation manner of the second aspect, in a fifth possible implementation manner, the determining the transmission version of the multimedia file according to whether the current network is a free network includes, if the current network is a free network, determining a highest-quality version of the multimedia file as the transmission version of the multimedia file; and if the current network is not a free network, processing the highest-quality version of the multimedia file according to a preset multimedia file quality parameter to obtain a second target quality version, and determining the second target quality version as the transmission version of the multimedia file; or acquiring remaining package data volume of the current network, determining a file size limit for current transmission according to the remaining package data volume, and determining the transmission version of the multimedia file according to the file size limit for current transmission.

With reference to the second aspect, the first possible implementation manner of the second aspect, the second possible implementation manner of the second aspect, the third possible implementation manner of the second aspect, the fourth possible implementation manner of the second aspect, or the fifth possible implementation manner of the second aspect, in a sixth possible implementation manner, after the transmitting the multimedia file according to the transmission version, the method further includes, when the transmission version is not the highest-quality version of the multimedia file, re-acquiring network information; if the re-acquired network information is better than the initially acquired network information, determining a retransmission version of the multimedia file according to the re-acquired network information, where multimedia file quality corresponding to the retransmission version is higher than multimedia file quality corresponding to the transmission version; and retransmitting the multimedia file according to the retransmission version.

With reference to the sixth possible implementation manner of the second aspect, in a seventh possible implementation manner, before the determining a retransmission version of the multimedia file according to the re-acquired network information, the method further includes detecting whether the re-acquired network information is better than the initially acquired network information.

With reference to the seventh possible implementation manner of the second aspect, in an eighth possible implementation manner, the detecting whether the re-acquired network information is better than the initially acquired network information includes, if both the re-acquired network information and the initially acquired network information are the network status information, detecting whether an extent to which the re-acquired network status information is better than the initially acquired network status information exceeds a first preset threshold; or if both the re-acquired network information and the initially acquired network information are the peer end restrictive conditions, comparing the re-acquired peer end restrictive condition with the initially acquired peer end restrictive condition, and if a result of a comparison between the peer end restrictive conditions meets a first preset condition, determining that the re-acquired network information is better than the initially acquired network information, where the first preset condition includes that the peer end restrictive condition changes from a restricted state to a restriction released state or changes from a restricted state to a restriction relaxed state; or if both the re-acquired network information and the initially acquired network information are the network type information, comparing the re-acquired network type information with the initially acquired network type information, and if a result of a comparison between the network type information meets a second preset condition, determining that the re-acquired network information is better than the initially acquired network information, where the second preset condition includes that a charging network changes to a free network or the remaining package data volume is greater than a second preset threshold.

With reference to the sixth possible implementation manner of the second aspect, in a ninth possible implementation manner, the determining a retransmission version of the multimedia file according to the re-acquired network information includes, if the network information is network status information, calculating a file size limit for retransmission according to the network status information, and determining the retransmission version of the multimedia file according to the file size limit for retransmission; or if the network information is a peer end restrictive condition, determining a file size limit for retransmission according to the peer end restrictive condition, and determining the retransmission version of the multimedia file according to the file size limit for retransmission; or if the network information is network type information, determining, according to the network type information, whether a current network is a free network, and determining the retransmission version of the multimedia file according to whether the current network is a free network.

With reference to the ninth possible implementation manner of the second aspect, in a tenth possible implementation manner, the calculating a file size limit for retransmission according to the network status information includes acquiring a transmission time limit, where the transmission time limit is set by a system or set by a user; and calculating the file size limit for retransmission according to the transmission time limit and the network status information.

With reference to the ninth possible implementation manner of the second aspect, in an eleventh possible implementation manner, the determining the retransmission version of the multimedia file according to the file size limit for retransmission includes determining whether the file size of the highest-quality version of the multimedia file is greater than the file size limit for retransmission; and if it is determined that the file size of the highest-quality version of the multimedia file is less than the file size limit for retransmission, determining the highest-quality version of the multimedia file as the retransmission version of the multimedia file; or if it is determined that the file size of the highest-quality version of the multimedia file is greater than the file size limit for retransmission, processing the highest-quality version of the multimedia file according to the file size limit for retransmission to obtain a third target quality version, and determining the third target quality version as the retransmission version of the multimedia file, where a file size of the third target quality version is less than or equal to the file size limit for retransmission, and multimedia file quality of the third target quality version is higher than multimedia file quality of the first target quality version.

With reference to the ninth possible implementation manner of the second aspect, in a twelfth possible implementation manner, the determining a file size limit for retransmission according to the peer end restrictive condition includes, when the peer end restrictive condition includes a file size limit, reading the file size limit from the peer end restrictive condition, and determining the read file size limit as the file size limit for retransmission; or when the peer end restrictive condition includes a multimedia file parameter limit, reading the multimedia file parameter limit from the peer end restrictive condition, and determining the file size limit for retransmission according to the multimedia file parameter limit, where the multimedia file parameter limit includes at least one of a definition limit, a resolution limit, a saturation limit, and a brightness limit; or when the peer end restrictive condition includes peer end user association information, reading the peer end user association information from the peer end restrictive condition, and determining the file size limit for retransmission according to the peer end user association information.

With reference to the ninth possible implementation manner of the second aspect, in a thirteenth possible implementation manner, the determining the retransmission version of the multimedia file according to whether the current network is a free network includes, if the current network is a free network, determining the highest-quality version of the multimedia file as the retransmission version of the multimedia file; or if the current network is not a free network, processing the highest-quality version of the multimedia file according to a preset multimedia file quality parameter to obtain a fourth target quality version, and determining the fourth target quality version as the retransmission version of the multimedia file, where multimedia file quality of the fourth target quality version is higher than multimedia file quality of the second target quality version; or acquiring remaining package data volume of the current network, determining a file size limit for retransmission according to the remaining package data volume, and determining the retransmission version of the multimedia file according to the file size limit for retransmission.

With reference to the sixth possible implementation manner of the second aspect, in a fourteenth possible implementation manner, after the transmitting the multimedia file according to the transmission version, the method further includes, when the transmission version is not the highest-quality version of the multimedia file, setting and recording a corresponding retransmission identifier for the multimedia file; detecting whether there is, at a local end, a multimedia file for which the retransmission identifier is set; and if it is detected that there is a multimedia file for which the retransmission identifier is set, performing the step of re-acquiring network information.

With reference to the second aspect, the first possible implementation manner of the second aspect, the second possible implementation manner of the second aspect, the third possible implementation manner of the second aspect, the fourth possible implementation manner of the second aspect, or the fifth possible implementation manner of the second aspect, in a fifteenth possible implementation manner, after the determining a transmission version of a multimedia file according to the network information, the method further includes, when the transmission version is not the highest-quality version of the multimedia file, generating first prompt information, where the first prompt information is used to indicate that the transmission version is not the highest-quality version of the multimedia file; and/or when the transmission version is the highest version of the multimedia file, generating second prompt information, where the second prompt information is used to indicate that the transmission version is the highest-quality version of the multimedia file.

With reference to the sixth possible implementation manner of the second aspect, in a sixteenth possible implementation manner, after the determining a retransmission version of the multimedia file according to the re-acquired network information, the method further includes generating third prompt information, where the third prompt information is used to indicate that the multimedia file quality of the retransmission version is higher than the multimedia file quality of the transmission version.

The technical solutions provided in the embodiments of the present disclosure bring the following beneficial effects.

Network information is acquired, a transmission version of a multimedia file is determined according to the network information, and the multimedia file is transmitted according to the transmission version, where different transmission versions are corresponding to different multimedia file quality, which resolves a problem, existing in a multimedia file transmission solution involved in related technologies, that selection of a multimedia file quality version is not appropriate. Compared with the multimedia file transmission solution involved in the related technologies, in the multimedia file transmission solutions provided in the embodiments of the present disclosure, the network information is automatically acquired, and the transmission version of the multimedia file is automatically determined according to the network information, which not only saves an operation of manually selecting, by a user, a transmission version and reduces operation complexity, but also improves appropriateness of determining a transmission version.

BRIEF DESCRIPTION OF THE DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DETAILED DESCRIPTION

To make the objectives, technical solutions, and advantages of the present disclosure clearer, the following further describes the embodiments of the present disclosure in detail with reference to the accompanying drawings.

Figure 1:
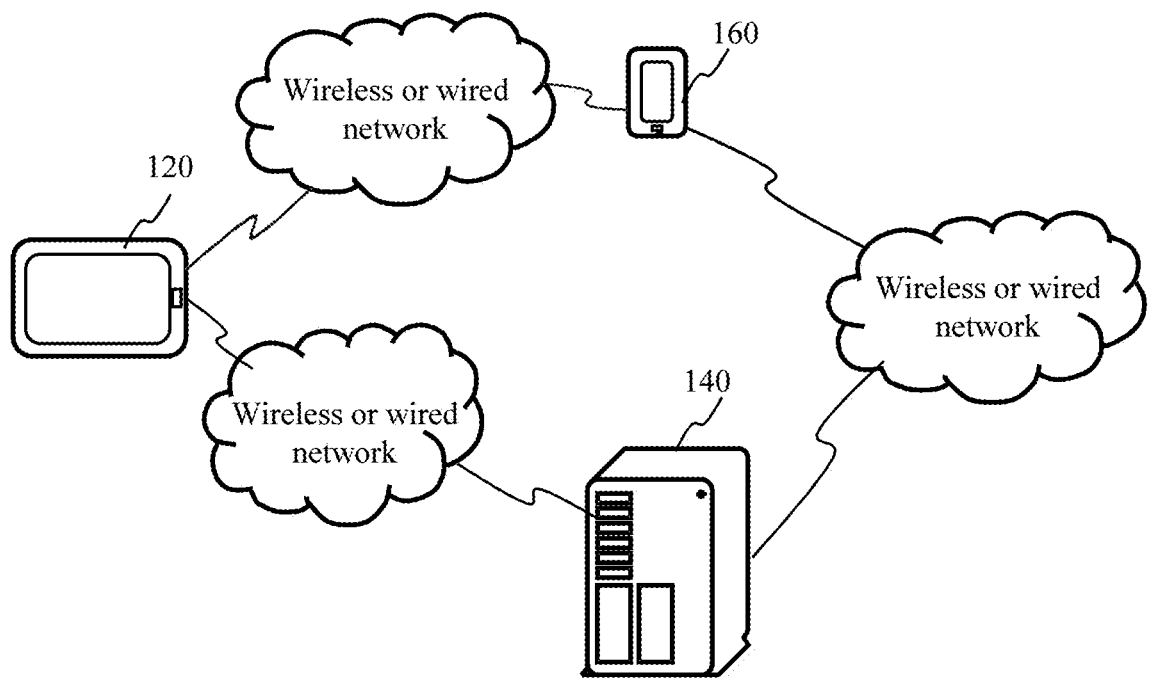
FIG. 1 is a schematic structural diagram of an implementation environment involved in embodiments of the present disclosure.

Referring to FIG. 1, FIG. 1 shows a schematic structural diagram of an implementation environment involved in embodiments of the present disclosure. The implementation environment includes a sending terminal 120, a server 140, and a receiving terminal 160.

The sending terminal 120 may be a mobile phone, a tablet computer, an e-book reader, a Moving Picture Experts Group Audio Layer III (MP3) player, a Moving Picture Experts Group Audio Layer IV (MP4) player, a laptop computer, or the like.

The sending terminal 120 may be connected to the server 140 through a wired network or a wireless network.

The server 140 may be a server, a server cluster that includes several servers, or a cloud computing service center.

The server 140 may be connected to the receiving terminal 160 through a wired network or a wireless network.

The receiving terminal 160 may be a mobile phone, a tablet computer, an e-book reader, an MP3 player, an MP4 player, a laptop computer, or the like.

In addition, the sending terminal 120 may also be connected to the receiving terminal 160 through a wired network or a wireless network.

In the embodiments of the present disclosure, the electronic device involved may be implemented as any device of the sending terminal 120, the server 140, and the receiving terminal 160 in the implementation environment shown in FIG. 1.

Figure 2:
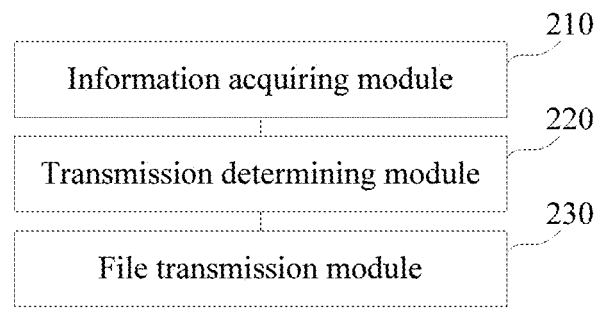
FIG. 2 is a structural block diagram of a multimedia file transmission apparatus according to an embodiment of the present disclosure.

Referring to FIG. 2, FIG. 2 shows a structural block diagram of a multimedia file transmission apparatus according to an embodiment of the present disclosure. The multimedia file transmission apparatus may be implemented as a part or all of an electronic device by using software, hardware, or a combination of software and hardware. The multimedia file transmission apparatus may include an information acquiring module 210, a transmission determining module 220, and a file transmission module 230.

The information acquiring module 210 is configured to acquire network information.

The transmission determining module 220 is configured to determine a transmission version of a multimedia file according to the network information, where different transmission versions are corresponding to different multimedia file quality.

The file transmission module 230 is configured to transmit the multimedia file according to the transmission version.

In conclusion, the multimedia file transmission apparatus provided in this embodiment acquires network information, determines a transmission version of a multimedia file according to the network information, and transmits the multimedia file according to the transmission version, where different transmission versions are corresponding to different multimedia file quality, which resolves a problem, existing in a multimedia file transmission solution involved in related technologies, that selection of a multimedia file quality version is not appropriate. Compared with the multimedia file transmission solution involved in the related technologies, the multimedia file transmission apparatus provided in this embodiment automatically acquires the network information, and automatically determines the transmission version of the multimedia file according to the network information, which not only saves an operation of manually selecting, by a user, a transmission version and reduces operation complexity, but also improves appropriateness of determining a transmission version.

Figure 3A:
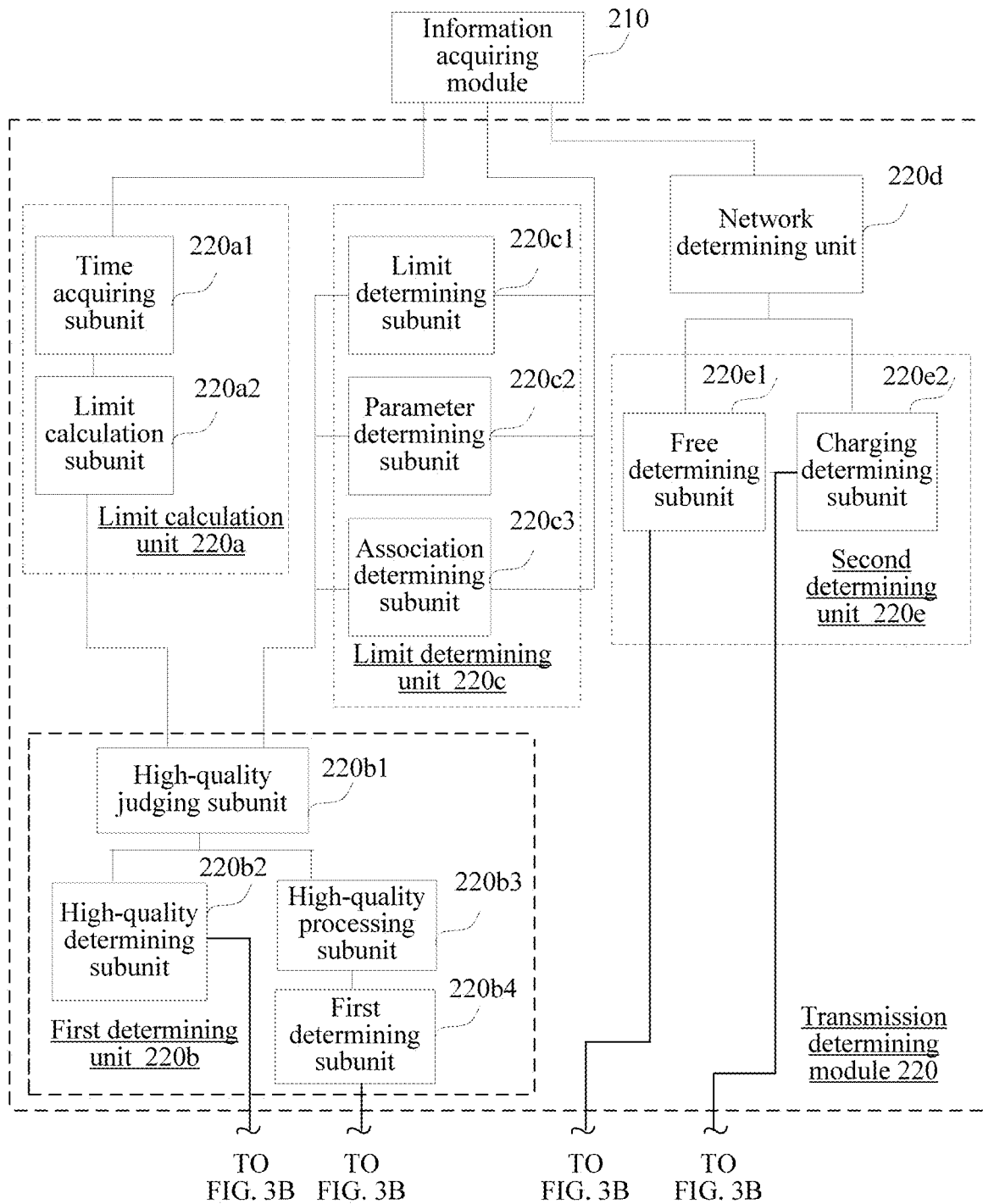
FIG. 3A, FIG. 3B and FIG. 3C are a structural block diagram of a multimedia file transmission apparatus according to another embodiment of the present disclosure.
Figure 3B:
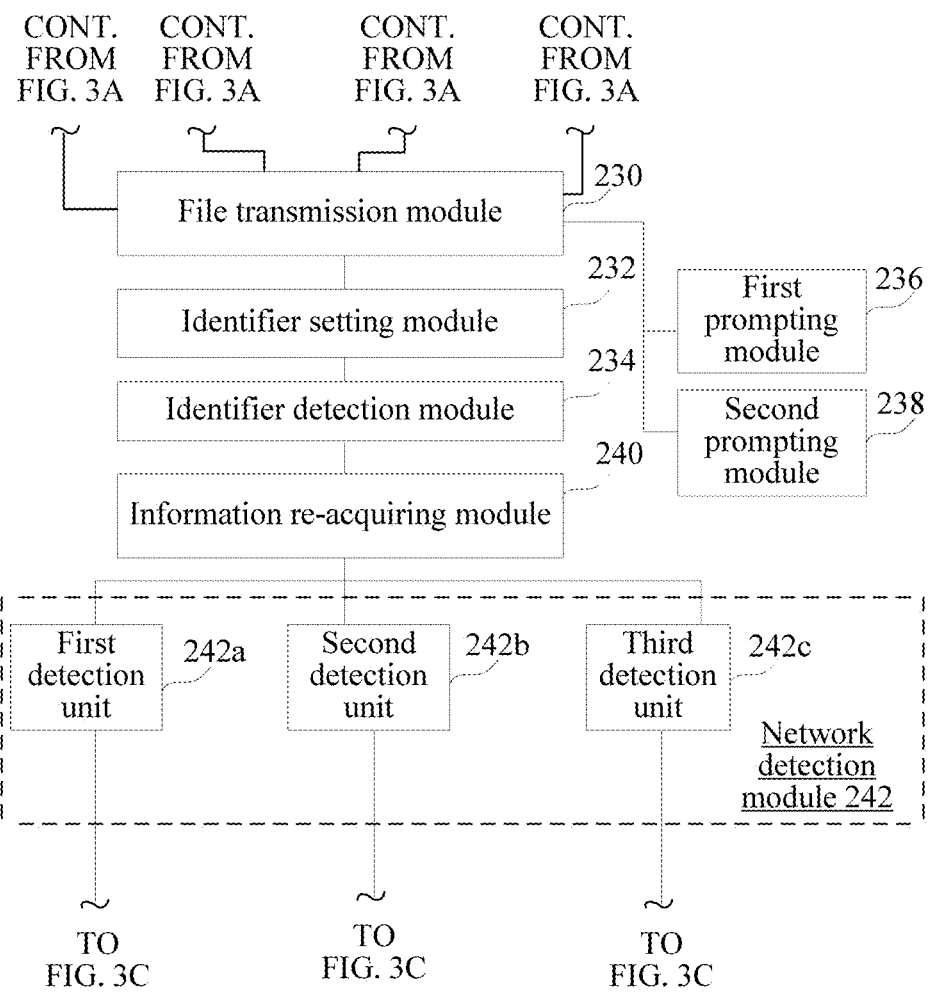
Figure 3C:
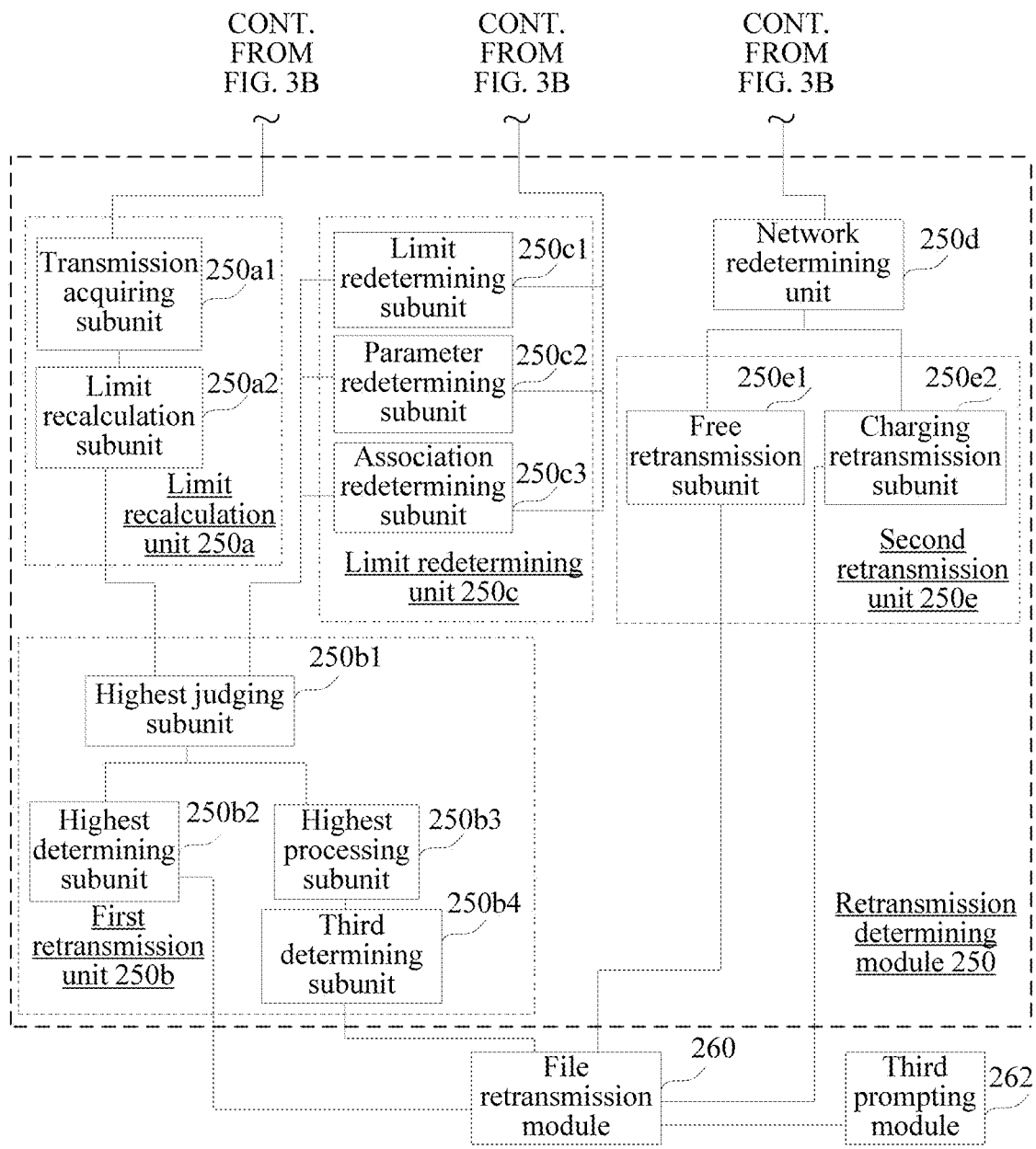

Referring to FIG. 3A, FIG. 3B and FIG. 3C, FIG. 3A, FIG. 3B and FIG. 3C show a structural block diagram of a multimedia file transmission apparatus according to another embodiment of the present disclosure. The multimedia file transmission apparatus may be implemented as a part or all of an electronic device by using software, hardware, or a combination of software and hardware. The multimedia file transmission apparatus may include an information acquiring module 210, a transmission determining module 220, and a file transmission module 230.

The information acquiring module 210 is configured to acquire network information.

The transmission determining module 220 is configured to determine a transmission version of a multimedia file according to the network information, where different transmission versions are corresponding to different multimedia file quality.

The transmission determining module 220 includes a limit calculation unit 220a and a first determining unit 220b; or a limit determining unit 220c and the first determining unit 220b; or a network determining unit 220d and a second determining unit 220e.

The limit calculation unit 220a is configured to, if the network information is network status information, calculate a file size limit for current transmission according to the network status information; and the first determining unit 220b is configured to determine the transmission version of the multimedia file according to the file size limit for current transmission.

The limit calculation unit 220a includes a time acquiring subunit 220a1 and a limit calculation subunit 220a2.

The time acquiring subunit 220a1 is configured to acquire a transmission time limit, where the transmission time limit is set by a system or set by a user.

The limit calculation subunit 220a2 is configured to calculate the file size limit for current transmission according to the transmission time limit and the network status information.

The limit determining unit 220c is configured to, if the network information is a peer end restrictive condition, determine a file size limit for current transmission according to the peer end restrictive condition; and the first determining unit 220b is configured to determine the transmission version of the multimedia file according to the file size limit for current transmission.

The limit determining unit 220c includes a limit determining subunit 220c1; or a parameter determining subunit 220c2; or an association determining subunit 220c3.

The limit determining subunit 220c1 is configured to, when the peer end restrictive condition includes a file size limit, read the file size limit from the peer end restrictive condition, and determine the read file size limit as the file size limit for current transmission.

The parameter determining subunit 220c2 is configured to, when the peer end restrictive condition includes a multimedia file parameter limit, read the multimedia file parameter limit from the peer end restrictive condition, and determine the file size limit for current transmission according to the multimedia file parameter limit, where the multimedia file parameter limit includes at least one of a definition limit, a resolution limit, a saturation limit, and a brightness limit.

The association determining subunit 220c3 is configured to, when the peer end restrictive condition includes peer end user association information, read the peer end user association information from the peer end restrictive condition, and determine the file size limit for current transmission according to the peer end user association information.

The first determining unit 220b includes a high-quality judging subunit 220b1, a high-quality determining subunit 220b2, a high-quality processing subunit 220b3, and a first determining subunit 220b4.

The high-quality judging subunit 220b1 is configured to determine whether a file size of a highest-quality version of the multimedia file is greater than the file size limit for current transmission.

The high-quality determining subunit 220b2 is configured to, if it is determined that the file size of the highest-quality version of the multimedia file is less than the file size limit for current transmission, determine the highest-quality version of the multimedia file as the transmission version of the multimedia file.

The high-quality processing subunit 220b3 is configured to, if it is determined that the file size of the highest-quality version of the multimedia file is greater than the file size limit for current transmission, process the highest-quality version of the multimedia file according to the file size limit for current transmission to obtain a first target quality version; and the first determining subunit 220b4 is configured to determine the first target quality version as the transmission version of the multimedia file, where a file size of the first target quality version is less than or equal to the file size limit for current transmission.

The network determining unit 220d is configured to, if the network information is network type information, determine, according to the network type information, whether a current network is a free network; and the second determining unit 220e is configured to determine the transmission version of the multimedia file according to whether the current network is a free network.

The second determining unit 220e includes a free determining subunit 220e1 and a charging determining subunit 220e2.

The free determining subunit 220e1 is configured to, if the current network is a free network, determine the highest-quality version of the multimedia file as the transmission version of the multimedia file.

The charging determining subunit 220e2 is configured to, if the current network is not a free network, process the highest-quality version of the multimedia file according to a preset multimedia file quality parameter to obtain a second target quality version, and determine the second target quality version as the transmission version of the multimedia file; or acquire remaining package data volume of the current network, determine a file size limit for current transmission according to the remaining package data volume, and determine the transmission version of the multimedia file according to the file size limit for current transmission.

The file transmission module 230 is configured to transmit the multimedia file according to the transmission version.

Optionally, the apparatus further includes an information re-acquiring module 240, a retransmission determining module 250, and a file retransmission module 260.

The information re-acquiring module 240 is configured to, when the transmission version is not the highest-quality version of the multimedia file, re-acquire network information.

The retransmission determining module 250 is configured to, if the re-acquired network information is better than the initially acquired network information, determine a retransmission version of the multimedia file according to the re-acquired network information, where multimedia file quality corresponding to the retransmission version is higher than multimedia file quality corresponding to the transmission version.

The retransmission determining module 250 includes a limit recalculation unit 250a and a first retransmission unit 250b; or a limit redetermining unit 250c and the first retransmission unit 250b; or a network redetermining unit 250d and a second retransmission unit 250e.

The limit recalculation unit 250a is configured to, if the network information is network status information, calculate a file size limit for retransmission according to the network status information; and the first retransmission unit 250b is configured to determine the retransmission version of the multimedia file according to the file size limit for retransmission.

The limit recalculation unit 250a includes a transmission acquiring subunit 250a1 and a limit recalculation subunit 250a2.

The transmission acquiring subunit 250a1 is configured to acquire a transmission time limit, where the transmission time limit is set by a system or set by a user.

The limit recalculation subunit 250a2 is configured to calculate the file size limit for retransmission according to the transmission time limit and the network status information.

The limit redetermining unit 250c is configured to, if the network information is a peer end restrictive condition, determine a file size limit for retransmission according to the peer end restrictive condition; and the first retransmission unit 250b is configured to determine the retransmission version of the multimedia file according to the file size limit for retransmission.

The limit redetermining unit 250c includes a limit redetermining subunit 250c1; or a parameter redetermining subunit 250c2; or an association redetermining subunit 250c3.

The limit redetermining subunit 250c1 is configured to, when the peer end restrictive condition includes a file size limit, read the file size limit from the peer end restrictive condition, and determine the read file size limit as the file size limit for retransmission.

The parameter redetermining subunit 250c2 is configured to, when the peer end restrictive condition includes a multimedia file parameter limit, read the multimedia file parameter limit from the peer end restrictive condition, and determine the file size limit for retransmission according to the multimedia file parameter limit, where the multimedia file parameter limit includes at least one of a definition limit, a resolution limit, a saturation limit, and a brightness limit.

The association redetermining subunit 250c3 is configured to, when the peer end restrictive condition includes peer end user association information, read the peer end user association information from the peer end restrictive condition, and determine the file size limit for retransmission according to the peer end user association information.

The first retransmission unit 250b includes a highest judging subunit 250b1, a highest determining subunit 250b2, a highest processing subunit 250b3, and a third determining subunit 250b4.

The highest judging subunit 250b1 is configured to determine whether the file size of the highest-quality version of the multimedia file is greater than the file size limit for retransmission.

The highest determining subunit 250b2 is configured to, if it is determined that the file size of the highest-quality version of the multimedia file is less than the file size limit for retransmission, determine the highest-quality version of the multimedia file as the retransmission version of the multimedia file.

The highest processing subunit 250b3 is configured to, if it is determined that the file size of the highest-quality version of the multimedia file is greater than the file size limit for retransmission, process the highest-quality version of the multimedia file according to the file size limit for retransmission to obtain a third target quality version; and the third determining subunit 250b4 is configured to determine the third target quality version as the retransmission version of the multimedia file, where a file size of the third target quality version is less than or equal to the file size limit for retransmission, and multimedia file quality of the third target quality version is higher than multimedia file quality of the first target quality version.

The network redetermining unit 250d is configured to, if the network information is network type information, determine, according to the network type information, whether a current network is a free network; and the second retransmission unit 250e is configured to determine the retransmission version of the multimedia file according to whether the current network is a free network.

The second retransmission unit 250e includes a free retransmission subunit 250e1 and a charging retransmission subunit 250e2.

The free retransmission subunit 250e1 is configured to, if the current network is a free network, determine the highest-quality version of the multimedia file as the retransmission version of the multimedia file.

The charging retransmission subunit 250e2 is configured to, if the current network is not a free network, process the highest-quality version of the multimedia file according to a preset multimedia file quality parameter to obtain a fourth target quality version, and determine the fourth target quality version as the retransmission version of the multimedia file, where multimedia file quality of the fourth target quality version is higher than multimedia file quality of the second target quality version; or acquire remaining package data volume of the current network, determine a file size limit for retransmission according to the remaining package data volume, and determine the retransmission version of the multimedia file according to the file size limit for retransmission.

The file retransmission module 260 is configured to retransmit the multimedia file according to the retransmission version.

Optionally, the apparatus further includes a network detection module 242.

The network detection module 242 is configured to detect whether the re-acquired network information is better than the initially acquired network information.

The network detection module 242 includes a first detection unit 242a; or a second detection unit 242b; or a third detection unit 242c.

The first detection unit 242a is configured to, if both the re-acquired network information and the initially acquired network information are the network status information, detect whether an extent to which the re-acquired network status information is better than the initially acquired network status information exceeds a first preset threshold.

The second detection unit 242b is configured to, if both the re-acquired network information and the initially acquired network information are the peer end restrictive conditions, compare the re-acquired peer end restrictive condition with the initially acquired peer end restrictive condition, and if a result of a comparison between the peer end restrictive conditions meets a first preset condition, determine that the re-acquired network information is better than the initially acquired network information, where the first preset condition includes that the peer end restrictive condition changes from a restricted state to a restriction released state or changes from a restricted state to a restriction relaxed state.

The third detection unit 242c is configured to, if both the re-acquired network information and the initially acquired network information are the network type information, compare the re-acquired network type information with the initially acquired network type information, and if a result of a comparison between the network type information meets a second preset condition, determine that the re-acquired network information is better than the initially acquired network information, where the second preset condition includes that a charging network changes to a free network or the remaining package data volume is greater than a second preset threshold.

Optionally, the apparatus further includes an identifier setting module 232 and an identifier detection module 234.

The identifier setting module 232 is configured to, when the transmission version is not the highest-quality version of the multimedia file, set and record a corresponding retransmission identifier for the multimedia file.

The identifier detection module 234 is configured to detect whether there is, at a local end, a multimedia file for which the retransmission identifier is set.

The information re-acquiring module 240 is further configured to, if it is detected that there is a multimedia file for which the retransmission identifier is set, perform the step of re-acquiring network information.

Optionally, the apparatus further includes a first prompting module 236; and/or a second prompting module 238.

The first prompting module 236 is configured to, when the transmission version is not the highest-quality version of the multimedia file, generate first prompt information, where the first prompt information is used to indicate that the transmission version is not the highest-quality version of the multimedia file.

The second prompting module 238 is configured to, when the transmission version is the highest version of the multimedia file, generate second prompt information, where the second prompt information is used to indicate that the transmission version is the highest-quality version of the multimedia file.

Optionally, the apparatus further includes a third prompting module 262.

The third prompting module 262 is configured to generate third prompt information, where the third prompt information is used to indicate that the multimedia file quality of the retransmission version is higher than the multimedia file quality of the transmission version.

In conclusion, the multimedia file transmission apparatus provided in this embodiment acquires network information, determines a transmission version of a multimedia file according to the network information, and transmits the multimedia file according to the transmission version, where different transmission versions are corresponding to different multimedia file quality, which resolves a problem, existing in a multimedia file transmission solution involved in related technologies, that selection of a multimedia file quality version is not appropriate. Compared with the multimedia file transmission solution involved in the related technologies, the multimedia file transmission apparatus provided in this embodiment automatically acquires the network information, and automatically determines the transmission version of the multimedia file according to the network information, which not only saves an operation of manually selecting, by a user, a transmission version and reduces operation complexity, but also improves appropriateness of determining a transmission version.

In addition, in the examples of this embodiment, the network information is network status information, a peer end restrictive condition, and network type information separately, and three solutions to automatically determining the transmission version of the multimedia file according to the network information are provided. Further, when the transmission version is not a highest-quality version of the multimedia file, network information is re-acquired, and when the re-acquired network information is better than the initially acquired network information, a high-quality retransmission version is determined according to the re-acquired network information, and the retransmission version is transmitted, so that a lower-quality transmission version can be automatically optimized, a degree of automation in multimedia file transmission is improved, an effect of quality optimization is achieved, and meanwhile, user experience is enhanced.

Figure 4:
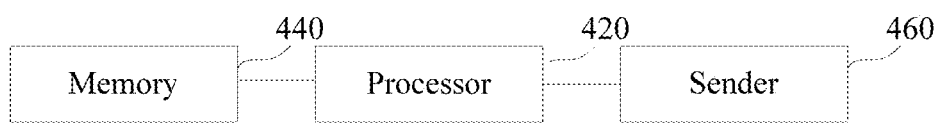
FIG. 4 is a schematic structural diagram of an electronic device according to an embodiment of the present disclosure.

Referring to FIG. 4, FIG. 4 shows a schematic structural diagram of an electronic device according to an embodiment of the present disclosure. The electronic device may be implemented as the sending terminal, the server, or the receiving terminal in the implementation environment shown in FIG. 1. The electronic device includes a processor 420, a memory 440, and a sender 460.

The processor 420 is configured to acquire network information.

The processor 420 is further configured to determine a transmission version of a multimedia file according to the network information, where different transmission versions are corresponding to different multimedia file quality.

The processor 420 is further configured to control, according to the transmission version, the sender 460 to transmit the multimedia file.

In conclusion, the electronic device provided in this embodiment acquires network information, determines a transmission version of a multimedia file according to the network information, and transmits the multimedia file according to the transmission version, where different transmission versions are corresponding to different multimedia file quality, which resolves a problem, existing in a multimedia file transmission solution involved in related technologies, that selection of a multimedia file quality version is not appropriate. Compared with the multimedia file transmission solution involved in the related technologies, the electronic device provided in this embodiment automatically acquires the network information, and automatically determines the transmission version of the multimedia file according to the network information, which not only saves an operation of manually selecting, by a user, a transmission version and reduces operation complexity, but also improves appropriateness of determining a transmission version.

In a first possible implementation manner of the embodiment shown in FIG. 4, the processor 420 is further configured to, if the network information is network status information, calculate a file size limit for current transmission according to the network status information, and determine the transmission version of the multimedia file according to the file size limit for current transmission; or the processor 420 is further configured to, if the network information is a peer end restrictive condition, determine a file size limit for current transmission according to the peer end restrictive condition, and determine the transmission version of the multimedia file according to the file size limit for current transmission; or the processor 420 is further configured to, if the network information is network type information, determine, according to the network type information, whether a current network is a free network, and determine the transmission version of the multimedia file according to whether the current network is a free network.

In a second possible implementation manner of the embodiment shown in FIG. 4, the processor 420 is further configured to acquire a transmission time limit, where the transmission time limit is set by a system or set by a user; and the processor 420 is further configured to calculate the file size limit for current transmission according to the transmission time limit and the network status information.

In a third possible implementation manner of the embodiment shown in FIG. 4, the processor 420 is further configured to determine whether a file size of a highest-quality version of the multimedia file is greater than the file size limit for current transmission; the processor 420 is further configured to, if it is determined that the file size of the highest-quality version of the multimedia file is less than the file size limit for current transmission, determine the highest-quality version of the multimedia file as the transmission version of the multimedia file; and the processor 420 is further configured to, if it is determined that the file size of the highest-quality version of the multimedia file is greater than the file size limit for current transmission, process the highest-quality version of the multimedia file according to the file size limit for current transmission to obtain a first target quality version, and determine the first target quality version as the transmission version of the multimedia file, where a file size of the first target quality version is less than or equal to the file size limit for current transmission.

In a fourth possible implementation manner of the embodiment shown in FIG. 4, the processor 420 is further configured to, when the peer end restrictive condition includes a file size limit, read the file size limit from the peer end restrictive condition, and determine the read file size limit as the file size limit for current transmission; or the processor 420 is further configured to, when the peer end restrictive condition includes a multimedia file parameter limit, read the multimedia file parameter limit from the peer end restrictive condition, and determine the file size limit for current transmission according to the multimedia file parameter limit, where the multimedia file parameter limit includes at least one of a definition limit, a resolution limit, a saturation limit, and a brightness limit; or the processor 420 is further configured to, when the peer end restrictive condition includes peer end user association information, read the peer end user association information from the peer end restrictive condition, and determine the file size limit for current transmission according to the peer end user association information.

In a fifth possible implementation manner of the embodiment shown in FIG. 4, the processor 420 is further configured to, if the current network is a free network, determine a highest-quality version of the multimedia file as the transmission version of the multimedia file; and the processor 420 is further configured to, if the current network is not a free network, process the highest-quality version of the multimedia file according to a preset multimedia file quality parameter to obtain a second target quality version, and determine the second target quality version as the transmission version of the multimedia file; or acquire remaining package data volume of the current network, determine a file size limit for current transmission according to the remaining package data volume, and determine the transmission version of the multimedia file according to the file size limit for current transmission.

In a sixth possible implementation manner of the embodiment shown in FIG. 4, the processor 420 is further configured to, when the transmission version is not the highest-quality version of the multimedia file, re-acquire network information; the processor 420 is further configured to, if the re-acquired network information is better than the initially acquired network information, determine a retransmission version of the multimedia file according to the re-acquired network information, where multimedia file quality corresponding to the retransmission version is higher than multimedia file quality corresponding to the transmission version; and the processor 420 is further configured to control the sender 460 to retransmit the multimedia file according to the retransmission version.

In a seventh possible implementation manner of the embodiment shown in FIG. 4, the processor 420 is further configured to detect whether the re-acquired network information is better than the initially acquired network information.

In an eighth possible implementation manner of the embodiment shown in FIG. 4, the processor 420 is further configured to, if both the re-acquired network information and the initially acquired network information are the network status information, detect whether an extent to which the re-acquired network status information is better than the initially acquired network status information exceeds a first preset threshold; or the processor 420 is further configured to, if both the re-acquired network information and the initially acquired network information are the peer end restrictive conditions, compare the re-acquired peer end restrictive condition with the initially acquired peer end restrictive condition, and if a result of a comparison between the peer end restrictive conditions meets a first preset condition, determine that the re-acquired network information is better than the initially acquired network information, where the first preset condition includes that the peer end restrictive condition changes from a restricted state to a restriction released state or changes from a restricted state to a restriction relaxed state; or the processor 420 is further configured to, if both the re-acquired network information and the initially acquired network information are the network type information, compare the re-acquired network type information with the initially acquired network type information, and if a result of a comparison between the network type information meets a second preset condition, determine that the re-acquired network information is better than the initially acquired network information, where the second preset condition includes that a charging network changes to a free network or the remaining package data volume is greater than a second preset threshold.

In a ninth possible implementation manner of the embodiment shown in FIG. 4, the processor 420 is further configured to, if the network information is network status information, calculate a file size limit for retransmission according to the network status information, and determine the retransmission version of the multimedia file according to the file size limit for retransmission; or the processor 420 is further configured to, if the network information is a peer end restrictive condition, determine a file size limit for retransmission according to the peer end restrictive condition, and determine the retransmission version of the multimedia file according to the file size limit for retransmission; or the processor 420 is further configured to, if the network information is network type information, determine, according to the network type information, whether a current network is a free network, and determine the retransmission version of the multimedia file according to whether the current network is a free network.

In a tenth possible implementation manner of the embodiment shown in FIG. 4, the processor 420 is further configured to acquire a transmission time limit, where the transmission time limit is set by a system or set by a user; and the processor 420 is further configured to calculate the file size limit for retransmission according to the transmission time limit and the network status information.

In an eleventh possible implementation manner of the embodiment shown in FIG. 4, the processor 420 is further configured to determine whether the file size of the highest-quality version of the multimedia file is greater than the file size limit for retransmission; the processor 420 is further configured to, if it is determined that the file size of the highest-quality version of the multimedia file is less than the file size limit for retransmission, determine the highest-quality version of the multimedia file as the retransmission version of the multimedia file; and the processor 420 is further configured to, if it is determined that the file size of the highest-quality version of the multimedia file is greater than the file size limit for retransmission, process the highest-quality version of the multimedia file according to the file size limit for retransmission to obtain a third target quality version, and determine the third target quality version as the retransmission version of the multimedia file, where a file size of the third target quality version is less than or equal to the file size limit for retransmission, and multimedia file quality of the third target quality version is higher than multimedia file quality of the first target quality version.

In a twelfth possible implementation manner of the embodiment shown in FIG. 4, the processor 420 is further configured to, when the peer end restrictive condition includes a file size limit, read the file size limit from the peer end restrictive condition, and determine the read file size limit as the file size limit for retransmission; or the processor 420 is further configured to, when the peer end restrictive condition includes a multimedia file parameter limit, read the multimedia file parameter limit from the peer end restrictive condition, and determine the file size limit for retransmission according to the multimedia file parameter limit, where the multimedia file parameter limit includes at least one of a definition limit, a resolution limit, a saturation limit, and a brightness limit; or the processor 420 is further configured to, when the peer end restrictive condition includes peer end user association information, read the peer end user association information from the peer end restrictive condition, and determine the file size limit for retransmission according to the peer end user association information.

In a thirteenth possible implementation manner of the embodiment shown in FIG. 4, the processor 420 is further configured to, if the current network is a free network, determine the highest-quality version of the multimedia file as the retransmission version of the multimedia file; and the processor 420 is further configured to, if the current network is not a free network, process the highest-quality version of the multimedia file according to a preset multimedia file quality parameter to obtain a fourth target quality version, and determine the fourth target quality version as the retransmission version of the multimedia file, where multimedia file quality of the fourth target quality version is higher than multimedia file quality of the second target quality version; or acquire remaining package data volume of the current network, determine a file size limit for retransmission according to the remaining package data volume, and determine the retransmission version of the multimedia file according to the file size limit for retransmission.

In a fourteenth possible implementation manner of the embodiment shown in FIG. 4, the processor 420 is further configured to, when the transmission version is not the highest-quality version of the multimedia file, set and record a corresponding retransmission identifier for the multimedia file; the processor 420 is further configured to detect whether there is, at a local end, a multimedia file for which the retransmission identifier is set; and the processor 420 is further configured to, if it is detected that there is a multimedia file for which the retransmission identifier is set, perform the step of re-acquiring network information.

In a fifteenth possible implementation manner of the embodiment shown in FIG. 4, the processor 420 is further configured to, when the transmission version is not the highest-quality version of the multimedia file, generate first prompt information, where the first prompt information is used to indicate that the transmission version is not the highest-quality version of the multimedia file; and/or the processor 420 is further configured to, when the transmission version is the highest version of the multimedia file, generate second prompt information, where the second prompt information is used to indicate that the transmission version is the highest-quality version of the multimedia file.

In a sixteenth possible implementation manner of the embodiment shown in FIG. 4, the processor 420 is further configured to generate third prompt information, where the third prompt information is used to indicate that the multimedia file quality of the retransmission version is higher than the multimedia file quality of the transmission version.

It should be noted that, the division of the foregoing function modules is merely used as an example for description when the multimedia file transmission apparatus and the electronic device provided in the foregoing embodiments transmit a multimedia file. In an actual application, the foregoing functions may be allocated to different function modules for implementation according to requirements, that is, an internal structure of the device is divided into different function modules, so as to implement all or some functions described above. In addition, the multimedia file transmission apparatus and the electronic device provided in the foregoing embodiments are based on the same concept as the following method embodiments of the multimedia file transmission method. For details on a specific implementation process, refer to the method embodiments, which are not described herein any further.

Figure 5:
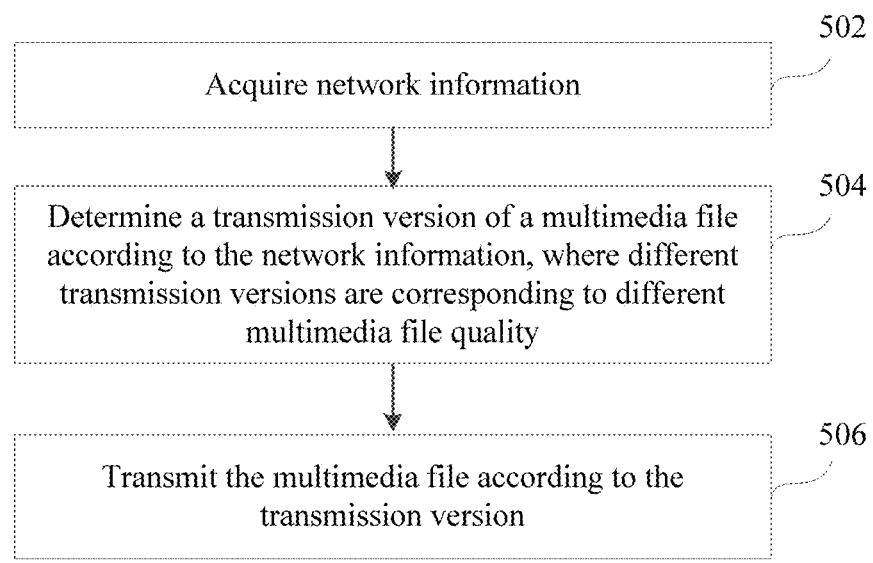
FIG. 5 is a method flowchart of a multimedia file transmission method according to an embodiment of the present disclosure.

Referring to FIG. 5, FIG. 5 shows a method flowchart of a multimedia file transmission method according to an embodiment of the present disclosure. This embodiment is described by using an example in which the multimedia file transmission method is applied at a sending terminal side, a server side, or a receiving terminal side in the implementation environment shown in FIG. 1. The multimedia file transmission method may include several steps as follows.

Step 502: Acquire network information.

Step 504: Determine a transmission version of a multimedia file according to the network information, where different transmission versions are corresponding to different multimedia file quality.

Step 506: Transmit the multimedia file according to the transmission version.

In conclusion, according to the multimedia file transmission method provided in this embodiment, network information is acquired, a transmission version of a multimedia file is determined according to the network information, and the multimedia file is transmitted according to the transmission version, where different transmission versions are corresponding to different multimedia file quality, which resolves a problem, existing in a multimedia file transmission solution involved in related technologies, that selection of a multimedia file quality version is not appropriate. Compared with the multimedia file transmission solution involved in the related technologies, in the multimedia file transmission method provided in this embodiment, the network information is automatically acquired, and the transmission version of the multimedia file is automatically determined according to the network information, which not only saves an operation of manually selecting, by a user, a transmission version and reduces operation complexity, but also improves appropriateness of determining a transmission version.

It should be first noted that in embodiments of the present disclosure, the multimedia file is any one of files such as an image, a video, and audio.

The network information is any one of network status information, a peer end restrictive condition, and network type information. The network status information includes at least one of a network standard, a network transmission rate, a network bandwidth, network stability, a network charging parameter, and other information; the peer end restrictive condition includes at least one of a file size limit, a multimedia file parameter limit, peer end user association information, and other information; the network type information includes information such as a free network or a charging network. The following introduces and describes in detail the multimedia file transmission method in three different implementation manners by using embodiments shown in FIG. 6A, FIG. 7, and FIG. 8.

Figure 6A:
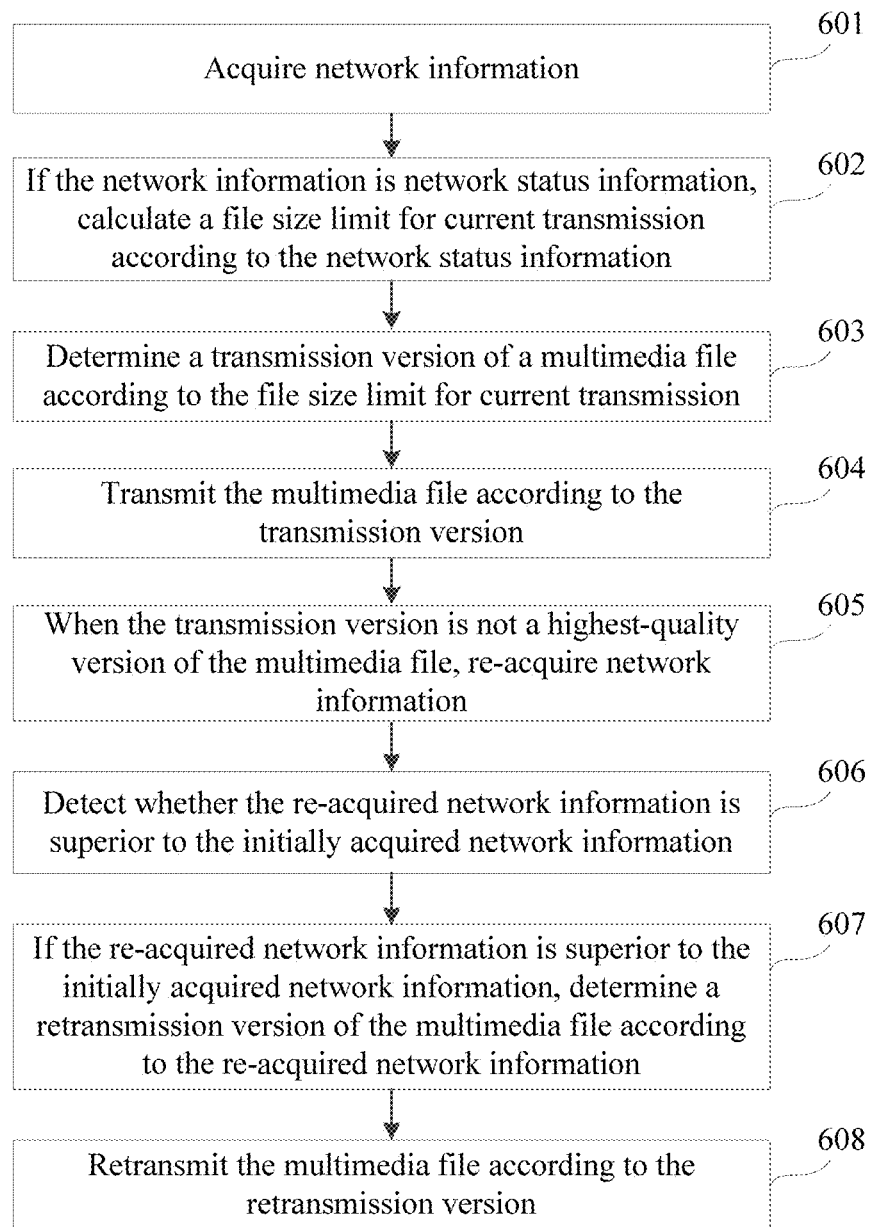
FIG. 6A is a method flowchart of a multimedia file transmission method according to another embodiment of the present disclosure.

Referring to FIG. 6A, FIG. 6A shows a method flowchart of a multimedia file transmission method according to another embodiment of the present disclosure. This embodiment is described by using an example in which the multimedia file transmission method is applied at the sending terminal side, the server side, or the receiving terminal side in the implementation environment shown in FIG. 1. The multimedia file transmission method may include several steps as follows.

Step 601: Acquire network information.

An electronic device acquires the network information. The network information is any one of network status information, a peer end restrictive condition, and network type information. In this embodiment, that the network information is the network status information is used as an example. The network status information includes at least one of a network standard, a network transmission rate, a network bandwidth, network stability, a network charging parameter, and other information.

Step 602: If the network information is network status information, calculate a file size limit for current transmission according to the network status information.

If the network information is the network status information, the electronic device calculates the file size limit for current transmission according to the network status information. The file size limit for current transmission refers to a maximum value that a file size of a multimedia file in current transmission can reach.

This step may include several substeps as follows.

First, acquire a transmission time limit.

The electronic device acquires the transmission time limit. The transmission time limit refers to a maximum value that a transmission time that needs to be consumed during current transmission can reach, and the transmission time limit is set by a system or set by a user.

When the transmission time limit is set by the system, the transmission time limit may be set to a fixed value, that is, 3 seconds, by the system by default. The transmission time limit may also be set to a different transmission time limit for different network status information by the system. When the network standard is a Second Generation Mobile Communication Technology Standards (2G) network standard, the transmission time limit is set to 5 seconds by the system by default; when the network standard is a Third Generation Mobile Communication Technology Standards (3G) network standard, the transmission time limit is set to 3 seconds by the system by default; when the network standard is a Fourth Generation Mobile Communication Technology Standards (4G) network standard, the transmission time limit is set to 2 seconds by the system by default; and so on.

Figure 6B:
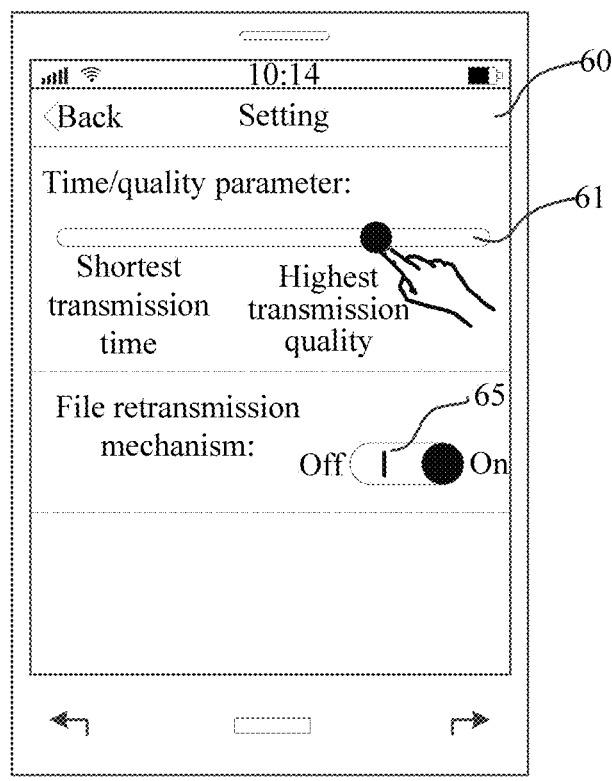
FIG. 6B is a schematic diagram of a configuration information setting interface involved in an embodiment of the present disclosure.

When the transmission time limit is set by the user, the electronic device may acquire, from stored configuration information, the transmission time limit preset by the user, or may acquire, before the multimedia file is transmitted, the transmission time limit set in real time by the user. In a possible embodiment, the electronic device acquires a selection signal corresponding to a time-quality parameter setting element, and determines the transmission time limit according to the selection signal. Referring to FIG. 6B, FIG. 6B shows a schematic diagram of a configuration information setting interface 60 involved in this embodiment. The time-quality parameter setting element may be presented in a form of a slider bar 61, that is, selection of a multimedia file transmission time and multimedia file transmission quality may be stepless and smooth selection. One end of the slider bar 61 represents a shortest transmission time, and the other end represents the highest transmission quality. The user can select an appropriate equilibrated position between the two ends according to requirements of the user on the multimedia file transmission time and multimedia file transmission quality. The electronic device determines the transmission time limit according to the selecting by the user, where the transmission time limit reflects maximum tolerance of the user to the multimedia file transmission time.

Second, calculate the file size limit for current transmission according to the transmission time limit and the network status information.

The electronic device calculates the file size limit for current transmission according to the transmission time limit and the network status information. For differences in types of and a quantity of parameters included in the network status information, there are multiple different manners of calculating the file size limit. The following exemplarily provides several possible calculation manners.

1. When the network status information is a network bandwidth, the transmission time limit is multiplied by the network bandwidth to obtain the file size limit for current transmission; for example, the network bandwidth is 100 kilobits per a second (kbps), and the transmission time limit is 5 seconds (s); then the file size limit is 500 kilobits (kb).

It should be noted that the network bandwidth acquired by the electronic device is a real-time network bandwidth of a current network. Meanwhile, the network bandwidth may be an unrestricted bandwidth, or may be a restricted bandwidth. For example, when there is a bandwidth restriction at a peer end, a network bandwidth acquired by the electronic device is a restricted bandwidth.

2. When the network status information includes a network bandwidth and network stability, an actual network bandwidth is obtained by means of calculation according to the network bandwidth and the network stability, and the transmission time limit is multiplied by the actual network bandwidth to obtain the file size limit for current transmission; for example, the network stability is represented by a packet loss rate of 5%, and when the network bandwidth is 100 kbps, the transmission time limit is 5 s, the actual network bandwidth may be considered as 95 kbps; then the file size limit is 475 kb.

In addition, in the foregoing possible calculation manners, if the network status information further includes a network standard, the file size limit obtained by means of calculation may be multiplied by a weighting parameter, corresponding to the network standard, according to the acquired network standard to obtain a file size limit on which the network standard is imposed.

In an actual application, there are multiple calculation manners of calculating the file size limit according to the transmission time limit and the network status information, and the foregoing calculation manners are merely exemplary and explanatory, and are not intended to limit the present disclosure.

Step 603: Determine a transmission version of a multimedia file according to the file size limit for current transmission.

The electronic device determines the transmission version of the multimedia file according to the file size limit for current transmission. A file size of the transmission version is less than or equal to the file size limit for current transmission.

This step may include several substeps as follows.

First, determine whether a file size of a highest-quality version of the multimedia file is greater than the file size limit for current transmission.

The highest-quality version may be an original version of the multimedia file, or may be a high-quality version after an original version is processed in advance. The electronic device compares the file size of the highest-quality version with the file size limit for current transmission.

Second, if it is determined that the file size of the highest-quality version of the multimedia file is less than the file size limit for current transmission, determine the highest-quality version of the multimedia file as the transmission version of the multimedia file.

When the file size of the highest-quality version is less than the file size limit for current transmission, the electronic device determines the highest-quality version as the transmission version of the multimedia file. For example, when the file size of the highest-quality version is 400 kb, and the file size limit for current transmission is 500 kb, the highest-quality version may be directly determined as the transmission version of the multimedia file.

Third, if it is determined that the file size of the highest-quality version of the multimedia file is greater than the file size limit for current transmission, process the highest-quality version of the multimedia file according to the file size limit for current transmission to obtain a first target quality version, and determine the first target quality version as the transmission version of the multimedia file. A file size of the first target quality version is less than or equal to the file size limit for current transmission.

When the file size of the highest-quality version is greater than the file size limit for current transmission, the electronic device may compress the multimedia file to obtain the first target quality version whose file size is less than the file size limit for current transmission, or may convert the multimedia file according to a preset conversion condition to obtain the first target quality version whose file size is less than the file size limit for current transmission. The preset conversion condition includes at least one of a definition parameter, a resolution parameter, a saturation parameter, and a brightness parameter. Then, the electronic device determines the first target quality version as the transmission version of the multimedia file.

Figure 6C:
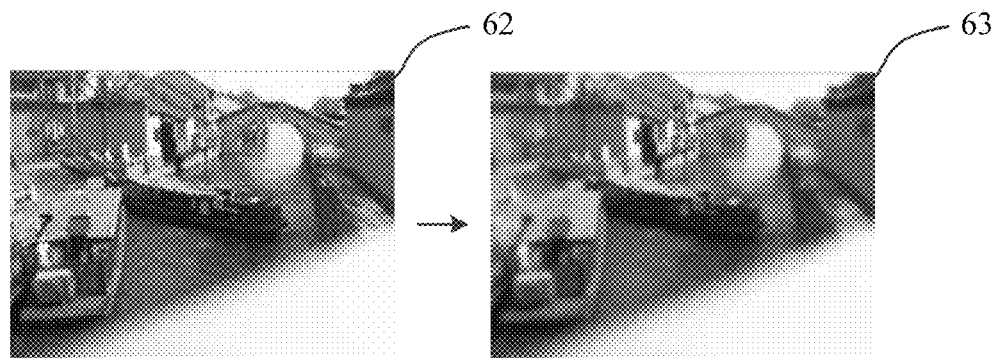
FIG. 6C is a schematic diagram of multimedia files of different quality versions involved in an embodiment of the present disclosure.

Referring to FIG. 6C, FIG. 6C shows a schematic diagram of the highest-quality version and the first target quality version that are of a same multimedia file (pictures are used as an example). The picture on a left side is the highest-quality version 62, and the picture on a right side is the first target quality version 63.

Step 604: Transmit the multimedia file according to the transmission version.

The electronic device transmits the multimedia file according to the transmission version.

If the electronic device is the sending terminal in the implementation environment shown in FIG. 1, the sending terminal may upload the transmission version to a server, or may send the transmission version to a receiving terminal; if the electronic device is the server in the implementation environment shown in FIG. 1, the server may send the transmission version to a receiving terminal; if the electronic device is the receiving terminal in the implementation environment shown in FIG. 1, the receiving terminal may download the transmission version from a server, or may receive the transmission version sent by a sending terminal.

In the multimedia file transmission method provided in this embodiment, a file retransmission mechanism is further provided. When the transmission version of the multimedia file is not the highest-quality version, the electronic device may further continue monitoring a network status. When the network status is improved, the highest-quality version of the multimedia file or a version whose multimedia file quality is higher than that of the transmission version is used as a retransmission version of the multimedia file, and the multimedia file is retransmitted, where the retransmission version having higher multimedia file quality may be used to replace a transmission version having lower multimedia file quality. The file retransmission mechanism may be enabled/disabled by a system by default, or enabling/disabling of the file retransmission mechanism may be preset by the user or set in real time by the user. Referring to FIG. 6B, in the configuration information setting interface 60, a switch 65 of the file retransmission mechanism is provided, and the user may preset the switch to an enabled state.

Figure 6D:
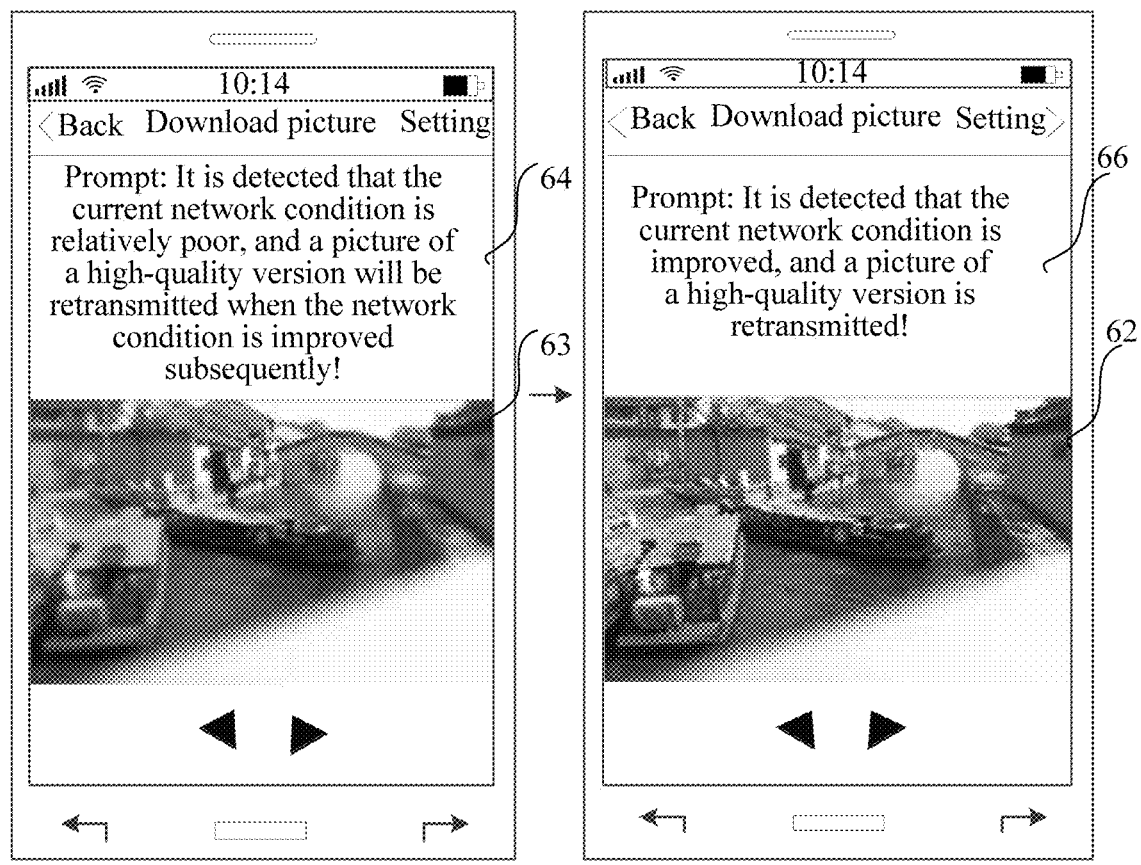
FIG. 6D is a schematic diagram, involved in an embodiment of the present disclosure, of downloading, by a user, a multimedia file.

Therefore, when the transmission version is not the highest-quality version of the multimedia file, the electronic device may generate first prompt information, where the first prompt information is used to indicate that the transmission version is not the highest-quality version of the multimedia file. Referring to FIG. 6D, FIG. 6D shows a schematic diagram when the user downloads the multimedia file (pictures are used as an example). It is assumed that the receiving terminal downloads the multimedia file from the server, and because a network condition is relatively poor, the multimedia file downloaded by the receiving terminal is not the highest-quality version of the multimedia file, that is, the first target quality version 63. In a process of delivering the first target quality version 63 of the multimedia file, the server may deliver the first prompt information 64 together with the first target quality version 63 to notify the user that a multimedia file being downloaded is not the highest-quality version of the multimedia file, and meanwhile, notify the user that when the network condition improves subsequently, the server will actively deliver the highest-quality version of the multimedia file and replace the first target quality version 63 with the highest-quality version. In addition, when the transmission version is the highest-quality version of the multimedia file, the electronic device may further generate second prompt information, where the second prompt information is used to indicate that the transmission version is the highest-quality version of the multimedia file.

Step 605: When the transmission version is not a highest-quality version of the multimedia file, re-acquire network information.

When the file retransmission mechanism is enabled, if a previous transmission version is not the highest-quality version of the multimedia file, the electronic device continues monitoring the network status, and re-acquires the network status information. The electronic device may monitor the network status in real time, regularly, or irregularly, and re-acquire the network status information.

Step 606: Detect whether the re-acquired network information is better than the initially acquired network information.

If both the re-acquired network information and the initially acquired network information are the network status information, the electronic device detects whether an extent to which the re-acquired network status information is better than the initially acquired network status information exceeds a first preset threshold. For example, when an increase in the network bandwidth exceeds a preset threshold, and/or a decrease in a network packet loss rate exceeds a preset threshold, and/or a decrease in a network dropped-call rate exceeds a preset threshold, it is determined that the re-acquired network information is better than the initially acquired network information.

Step 607: If the re-acquired network information is better than the initially acquired network information, determine a retransmission version of the multimedia file according to the re-acquired network information.

If the re-acquired network information is better than the initially acquired network information, the electronic device determines the retransmission version of the multimedia file according to the re-acquired network information. Multimedia file quality corresponding to the retransmission version is higher than multimedia file quality corresponding to the transmission version.

When the network information is network status information, this step may include several substeps as follows.

First, calculate a file size limit for retransmission according to the network status information.

1. Acquire a transmission time limit, where the transmission time limit is set by a system or set by a user.

2. Calculate the file size limit for retransmission according to the transmission time limit and the network status information.

Second, determine the retransmission version of the multimedia file according to the file size limit for retransmission.

1. Determine whether the file size of the highest-quality version of the multimedia file is greater than the file size limit for retransmission.

2. If it is determined that the file size of the highest-quality version of the multimedia file is less than the file size limit for retransmission, determine the highest-quality version of the multimedia file as the retransmission version of the multimedia file.

3. If it is determined that the file size of the highest-quality version of the multimedia file is greater than the file size limit for retransmission, process the highest-quality version of the multimedia file according to the file size limit for retransmission to obtain a third target quality version, and determine the third target quality version as the retransmission version of the multimedia file, where a file size of the third target quality version is less than or equal to the file size limit for retransmission, and multimedia file quality of the third target quality version is higher than multimedia file quality of the first target quality version.

The foregoing substeps of step 607 are the same as or similar to those of step 602 to step 603; for details, reference may be made to the foregoing step 602 to step 603, and the details are not described again.

It should be noted that the multimedia file quality of the retransmission version is higher than the multimedia file quality of the transmission version, and an extent to which the multimedia file quality is improved is relatively large. Because generation of the retransmission version is triggered only when the electronic device detects that the re-acquired network status information is better than the initially acquired network status information and an extent to which the network status information is improved exceeds the first preset threshold, the retransmission version is generally the highest-quality version of the multimedia file, or a high-quality version whose multimedia file quality is slightly lower than that of the highest-quality version.

Step 608: Retransmit the multimedia file according to the retransmission version.

The electronic device retransmits the multimedia file according to the retransmission version. In an actual application, the electronic device may directly transmit the retransmission version in a silent manner in a case in which the file retransmission mechanism is enabled, or may inquire, before transmitting the retransmission version, whether the user confirms retransmission, and if the user confirms retransmission, transmit the retransmission version.

Further, a device that receives the retransmission version may store both multimedia files of the two versions, that is, a lower-quality transmission version and a higher-quality retransmission version, or may automatically replace the multimedia file of the lower-quality transmission version with the multimedia file of the higher-quality retransmission version.

Optionally, with transmission of the retransmission version, the electronic device may further generate third prompt information. The third prompt information is used to indicate that the multimedia file quality of the retransmission version is higher than the multimedia file quality of the transmission version. Referring to FIG. 6D, that the user downloads the multimedia file is still used as an example. If it is assumed that after downloading a multimedia file of the first target quality version 63, the receiving terminal monitors the network status and finds that an extent to which the network status is improved is relatively large, the receiving terminal sends a file retransmission request to the server, and the server may deliver the highest-quality version 62 of the multimedia file and the third prompt information 66 together to notify the user that a multimedia file being downloaded is the highest-quality version 62 of the multimedia file.

It should be noted that after the electronic device transmits a multimedia file, a transmission control mechanism for whether the multimedia file needs to be retransmitted in a subsequent process may be that, when a transmission version is not a highest-quality version of the multimedia file, the electronic device sets and records a corresponding retransmission identifier for the multimedia file, where the retransmission identifier is used to indicate that the multimedia file needs to be retransmitted in the subsequent process; in a case in which the file retransmission mechanism is enabled, the electronic device detects, in real time, regularly, or irregularly, whether there is, at a local end, a multimedia file for which a retransmission identifier is set; if it is detected that there is a multimedia file for which a retransmission identifier is set, the step of re-acquiring network information is performed, and in a case in which re-acquired network information is better than initially acquired network information, a high-quality retransmission version is retransmitted.

For example, the electronic device has uploaded ten pictures in a period of time, where four uploaded pictures are lower-quality versions, and the other six uploaded pictures are highest-quality versions. The electronic device sets retransmission identifiers for the foregoing four uploaded pictures of the lower-quality versions, and detects, at a preset time interval, whether there is, at the local end, a picture that needs to be retransmitted, that is, detects whether there is, at the local end, a picture for which a retransmission identifier is set; if there is, at the local end, a picture that needs to be retransmitted, re-acquires network information, and retransmits a high-quality retransmission version in a case in which the re-acquired network information is better than the initially acquired network information.

In conclusion, according to the multimedia file transmission method provided in this embodiment, network information is acquired, a transmission version of a multimedia file is determined according to the network information, and the multimedia file is transmitted according to the transmission version, where different transmission versions are corresponding to different multimedia file quality, which resolves a problem, existing in a multimedia file transmission solution involved in related technologies, that selection of a multimedia file quality version is not appropriate. Compared with the multimedia file transmission solution involved in the related technologies, in the multimedia file transmission method provided in this embodiment, the network information is automatically acquired, and the transmission version of the multimedia file is automatically determined according to the network information, which not only saves an operation of manually selecting, by a user, a transmission version and reduces operation complexity, but also improves appropriateness of determining a transmission version.

In addition, in this embodiment, that the network information is network status information is used as an example, and a solution of automatically determining the transmission version of the multimedia file according to the network status information is provided. Further, when the transmission version is not a highest-quality version of the multimedia file, network information is re-acquired, and when the re-acquired network information is better than the initially acquired network information, a high-quality retransmission version is determined according to the re-acquired network information, and the retransmission version is transmitted, so that a lower-quality transmission version can be automatically optimized, a degree of automation in multimedia file transmission is improved, an effect of quality optimization is achieved, and meanwhile, user experience is enhanced.

In a specific example, it is assumed that the multimedia file transmission method provided in this embodiment of the present disclosure is applied in a social application scenario. The social application scenario includes a sending terminal, a server connected to the sending terminal through a wired network or a wireless network, and a receiving terminal connected to the server through a wired network or a wireless network. It is assumed that when uploading a multimedia file to the server, the sending terminal determines, according to acquired network information, that a network environment between the sending terminal and the server is relatively desirable; therefore, a determined transmission version is a highest-quality version, and the highest-quality version is uploaded to the server. However, after receiving a multimedia file downloading request sent by the receiving terminal, the server determines, according to acquired network information, that a network environment between the server and the receiving terminal is relatively poor; therefore, a determined transmission version is a first target quality version whose multimedia file quality is relatively low, and the first target quality version is sent to the receiving terminal. Then, the server records that what is previously sent by the server to the receiving terminal is the first target quality version, monitors and acquires network information at a preset time interval, and actively pushes the highest-quality version of the multimedia file to the receiving terminal when finding that the network information is improved to an extent; correspondingly, after receiving the highest-quality version of the multimedia file, the receiving terminal automatically replaces the original first target quality version with the highest-quality version, so that the user may view the multimedia file of the highest-quality version in a subsequent process.

Figure 7:
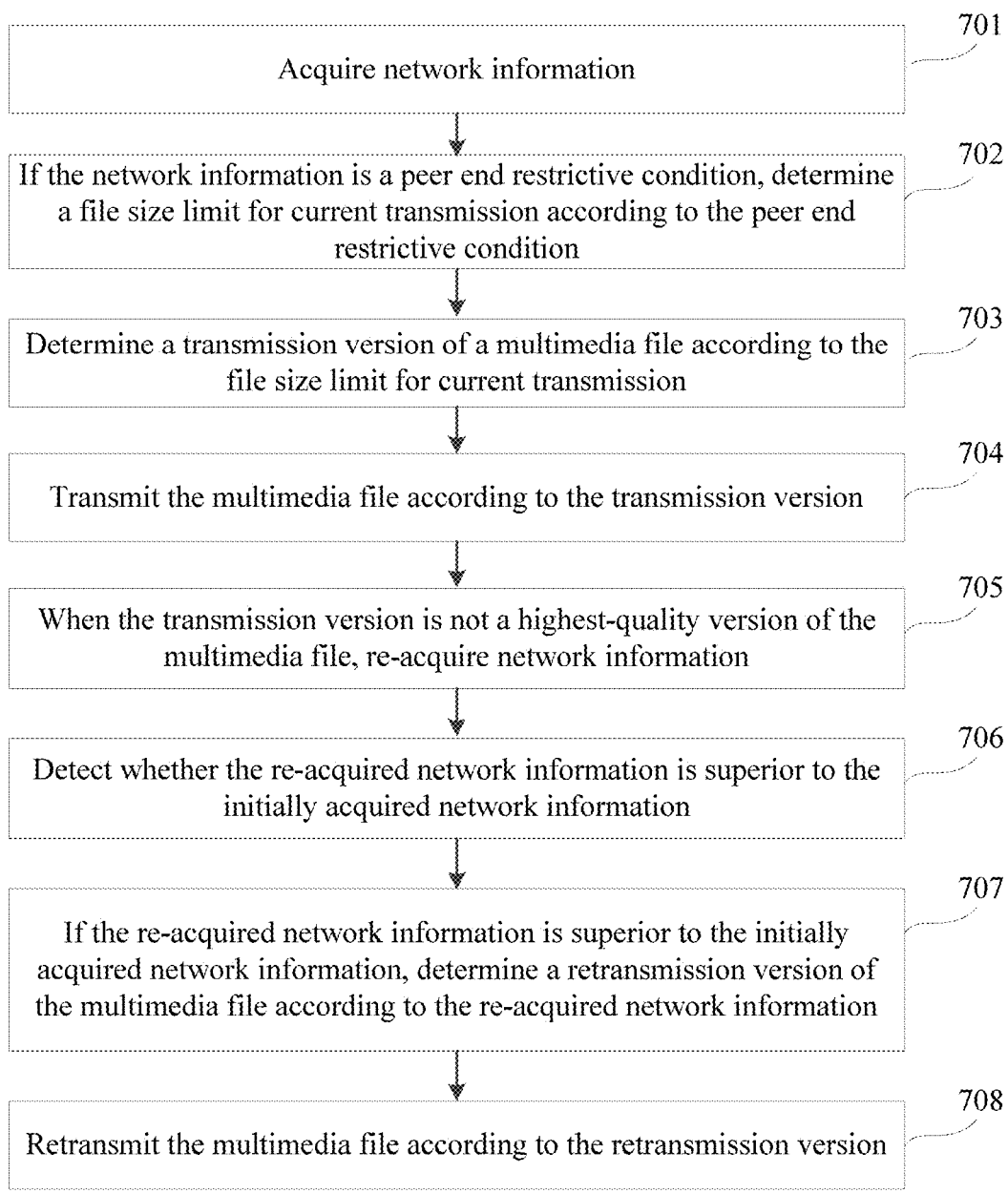
FIG. 7 is a method flowchart of a multimedia file transmission method according to still another embodiment of the present disclosure.

Referring to FIG. 7, FIG. 7 shows a method flowchart of a multimedia file transmission method according to still another embodiment of the present disclosure. This embodiment is described by using an example in which the multimedia file transmission method is applied at the sending terminal side, the server side, or the receiving terminal side in the implementation environment shown in FIG. 1. The multimedia file transmission method may include several steps as follows.

Step 701: Acquire network information.

An electronic device acquires the network information. The network information is any one of network status information, a peer end restrictive condition, and network type information. In this embodiment, that the network information is the peer end restrictive condition is used as an example. The peer end restrictive condition includes at least one of a file size limit, a multimedia file parameter limit, peer end user association information, and other information.

Step 702: If the network information is a peer end restrictive condition, determine a file size limit for current transmission according to the peer end restrictive condition.

If the network information is the peer end restrictive condition, the electronic device determines the file size limit for current transmission according to the peer end restrictive condition. The file size limit refers to a maximum value that a file size of a multimedia file in current transmission can reach.

This step may include the following possible implementation manners.

In a first possible implementation manner, when the peer end restrictive condition includes the file size limit, the file size limit is read from the peer end restrictive condition, and the read file size limit is determined as the file size limit for current transmission.

For example, the peer end restrictive condition may directly be a restriction on a file size. If a file size limit set by a multimedia file receiving party is 500 kb, a multimedia file sending party may directly use the file size limit set by the multimedia file receiving party, that is, 500 kb, as the file size limit for current transmission.

In a second possible implementation manner, when the peer end restrictive condition includes the multimedia file parameter limit, the multimedia file parameter limit is read from the peer end restrictive condition, and the file size limit for current transmission is determined according to the multimedia file parameter limit.

The multimedia file parameter limit includes at least one of a definition limit, a resolution limit, a saturation limit, and a brightness limit. A multimedia file receiving party may also restrict a multimedia file parameter for receiving a multimedia file, for example, set the resolution limit to 1024*600, which indicates that a resolution of a multimedia file sent by a multimedia file sending party cannot exceed 1024*600. After reading the multimedia file parameter limit, the electronic device may analyze and calculate the multimedia file parameter limit, and determine the file size limit for current transmission.

In a third possible implementation manner, when the peer end restrictive condition includes the peer end user association information, the peer end user association information is read from the peer end restrictive condition, and the file size limit for current transmission is determined according to the peer end user association information.

The peer end user association information may include at least one of a peer end user account level, peer end user geographical location information, a peer end user Internet Protocol (IP) address, and other information. After reading the peer end user association information, the electronic device may analyze and calculate the peer end user association information, and determine the file size limit for current transmission.

In an actual application, there are multiple manners of determining the file size limit for current transmission according to the peer end restrictive condition, and the foregoing manners are merely exemplary and explanatory, and are not intended to limit the present disclosure.

Step 703: Determine a transmission version of a multimedia file according to the file size limit for current transmission.

The electronic device determines the transmission version of the multimedia file according to the file size limit for current transmission. A file size of the transmission version is less than or equal to the file size limit.

This step may include several substeps as follows.

First, determine whether a file size of a highest-quality version of the multimedia file is greater than the file size limit for current transmission.

The highest-quality version may be an original version of the multimedia file, or may be a high-quality version after an original version is processed in advance. The electronic device compares the file size of the highest-quality version with the file size limit for current transmission.

Second, if it is determined that the file size of the highest-quality version of the multimedia file is less than the file size limit for current transmission, determine the highest-quality version of the multimedia file as the transmission version of the multimedia file.

When the file size of the highest-quality version is less than the file size limit for current transmission, the electronic device determines the highest-quality version as the transmission version of the multimedia file. For example, when the file size of the highest-quality version is 400 kb, and the file size limit for current transmission is 500 kb, the highest-quality version may be directly determined as the transmission version of the multimedia file.

Third, if it is determined that the file size of the highest-quality version of the multimedia file is greater than the file size limit for current transmission, process the highest-quality version of the multimedia file according to the file size limit for current transmission to obtain a first target quality version, and determine the first target quality version as the transmission version of the multimedia file. A file size of the first target quality version is less than or equal to the file size limit for current transmission.

When the file size of the highest-quality version is greater than the file size limit for current transmission, the electronic device may compress the multimedia file to obtain the first target quality version whose file size is less than the file size limit for current transmission, or may convert the multimedia file according to a preset conversion condition to obtain the first target quality version whose file size is less than the file size limit for current transmission. The preset conversion condition includes at least one of a definition parameter, a resolution parameter, a saturation parameter, and a brightness parameter. Then, the electronic device determines the first target quality version as the transmission version of the multimedia file.

Step 704: Transmit the multimedia file according to the transmission version.

The electronic device transmits the multimedia file according to the transmission version. Transmission paths of the multimedia file include that the sending terminal uploads the multimedia file to the server, and the receiving terminal downloads the multimedia file from the server; and the sending terminal directly transmits the multimedia file to the receiving terminal.

In the multimedia file transmission method provided in this embodiment, a file retransmission mechanism is further provided. When the transmission version of the multimedia file is not the highest-quality version, the electronic device may further continue monitoring a network status. When the network status is improved, the highest-quality version of the multimedia file or a version whose multimedia file quality is higher than that of the transmission version is used as a retransmission version of the multimedia file, and the multimedia file is retransmitted, where the retransmission version having higher multimedia file quality may be used to replace the transmission version having lower multimedia file quality. The file retransmission mechanism may be enabled/disabled by a system by default, or enabling/disabling of the file retransmission mechanism may be preset by the user or set in real time by the user.

Therefore, when the transmission version is not the highest-quality version of the multimedia file, the electronic device may generate first prompt information, where the first prompt information is used to indicate that the transmission version is not the highest-quality version of the multimedia file. In addition, when the transmission version is the highest-quality version of the multimedia file, the electronic device may further generate second prompt information, where the second prompt information is used to indicate that the transmission version is the highest-quality version of the multimedia file.

Step 705: When the transmission version is not a highest-quality version of the multimedia file, re-acquire network information.

When the file retransmission mechanism is enabled, if a previous transmission version is not the highest-quality version of the multimedia file, the electronic device continues monitoring the peer end restrictive condition. The electronic device may monitor and acquire the peer end restrictive condition in real time, regularly, or irregularly.

Step 706: Detect whether the re-acquired network information is better than the initially acquired network information.

If both the re-acquired network information and the initially acquired network information are the peer end restrictive conditions, the re-acquired peer end restrictive condition is compared with the initially acquired peer end restrictive condition, and if a result of a comparison between the peer end restrictive conditions meets a first preset condition, it is determined that the re-acquired network information is better than the initially acquired network information. The first preset condition includes that the peer end restrictive condition changes from a restricted state to a restriction released state or changes from a restricted state to a restriction relaxed state.

For example, if the initially acquired peer end restrictive condition includes a file size limit of 500 kb, and the re-acquired peer end restrictive condition includes a file size limit of 1 Megabits (M) or has no restriction on a file size, it indicates that the re-acquired network information is better than the initially acquired network information.

Step 707: If the re-acquired network information is better than the initially acquired network information, determine a retransmission version of the multimedia file according to the re-acquired network information.

If the re-acquired network information is better than the initially acquired network information, the electronic device determines the retransmission version of the multimedia file according to the re-acquired network information. Multimedia file quality corresponding to the retransmission version is higher than multimedia file quality corresponding to the transmission version.

When the network information is a peer end restrictive condition, this step may include several substeps as follows.

First, determine a file size limit for retransmission according to the peer end restrictive condition.

1. When the peer end restrictive condition includes a file size limit, read the file size limit from the peer end restrictive condition, and determine the read file size limit as the file size limit for retransmission.

2. When the peer end restrictive condition includes a multimedia file parameter limit, read the multimedia file parameter limit from the peer end restrictive condition, and determine the file size limit for retransmission according to the multimedia file parameter limit.

The multimedia file parameter limit includes at least one of a definition limit, a resolution limit, a saturation limit, and a brightness limit.

3. When the peer end restrictive condition includes peer end user association information, read the peer end user association information from the peer end restrictive condition, and determine the file size limit for retransmission according to the peer end user association information.

Second, determine the retransmission version of the multimedia file according to the file size limit.

1. Determine whether the file size of the highest-quality version of the multimedia file is greater than the file size limit for retransmission.

2. If it is determined that the file size of the highest-quality version of the multimedia file is less than the file size limit for retransmission, determine the highest-quality version of the multimedia file as the retransmission version of the multimedia file.

3. If it is determined that the file size of the highest-quality version of the multimedia file is greater than the file size limit for retransmission, process the highest-quality version of the multimedia file according to the file size limit for retransmission to obtain a third target quality version, and determine the third target quality version as the retransmission version of the multimedia file, where a file size of the third target quality version is less than or equal to the file size limit for retransmission, and multimedia file quality of the third target quality version is higher than multimedia file quality of the first target quality version.

The foregoing substeps of step 707 are the same as or similar to those of step 702 to step 703; for details, reference may be made to the foregoing step 702 to step 703, and the details are not described again.

It should be noted that the multimedia file quality of the retransmission version is higher than the multimedia file quality of the transmission version, and an extent to which the multimedia file quality is improved is relatively large. Therefore, the retransmission version is generally the highest-quality version of the multimedia file, or a high-quality version whose multimedia file quality is slightly lower than that of the highest-quality version.

Step 708: Retransmit the multimedia file according to the retransmission version.

The electronic device retransmits the multimedia file according to the retransmission version. In an actual application, the electronic device may directly transmit the retransmission version in a silent manner in a case in which the file retransmission mechanism is enabled, or may inquire, before transmitting the retransmission version, whether the user confirms retransmission, and if the user confirms retransmission, transmit the retransmission version.

Further, a device that receives the retransmission version may store both multimedia files of the two versions, that is, a lower-quality transmission version and a higher-quality retransmission version, or may automatically replace the multimedia file of the lower-quality transmission version with the multimedia file of the higher-quality retransmission version.

Optionally, with transmission of the retransmission version, the electronic device may further generate third prompt information. The third prompt information is used to indicate that the multimedia file quality of the retransmission version is higher than the multimedia file quality of the transmission version.

In conclusion, according to the multimedia file transmission method provided in this embodiment, network information is acquired, a transmission version of a multimedia file is determined according to the network information, and the multimedia file is transmitted according to the transmission version, where different transmission versions are corresponding to different multimedia file quality, which resolves a problem, existing in a multimedia file transmission solution involved in related technologies, that selection of a multimedia file quality version is not appropriate. Compared with the multimedia file transmission solution involved in the related technologies, in the multimedia file transmission method provided in this embodiment, the network information is automatically acquired, and the transmission version of the multimedia file is automatically determined according to the network information, which not only saves an operation of manually selecting, by a user, a transmission version and reduces operation complexity, but also improves appropriateness of determining a transmission version.

In addition, in this embodiment, that the network information is a peer end restrictive condition is used as an example, and a solution of automatically determining the transmission version of the multimedia file according to the peer end restrictive condition is provided. Further, when the transmission version is not a highest-quality version of the multimedia file, network information is re-acquired, and when the re-acquired network information is better than the initially acquired network information, a high-quality retransmission version is determined according to the re-acquired network information, and the retransmission version is transmitted, so that a lower-quality transmission version can be automatically optimized, a degree of automation in multimedia file transmission is improved, an effect of quality optimization is achieved, and meanwhile, user experience is enhanced.

Figure 8:
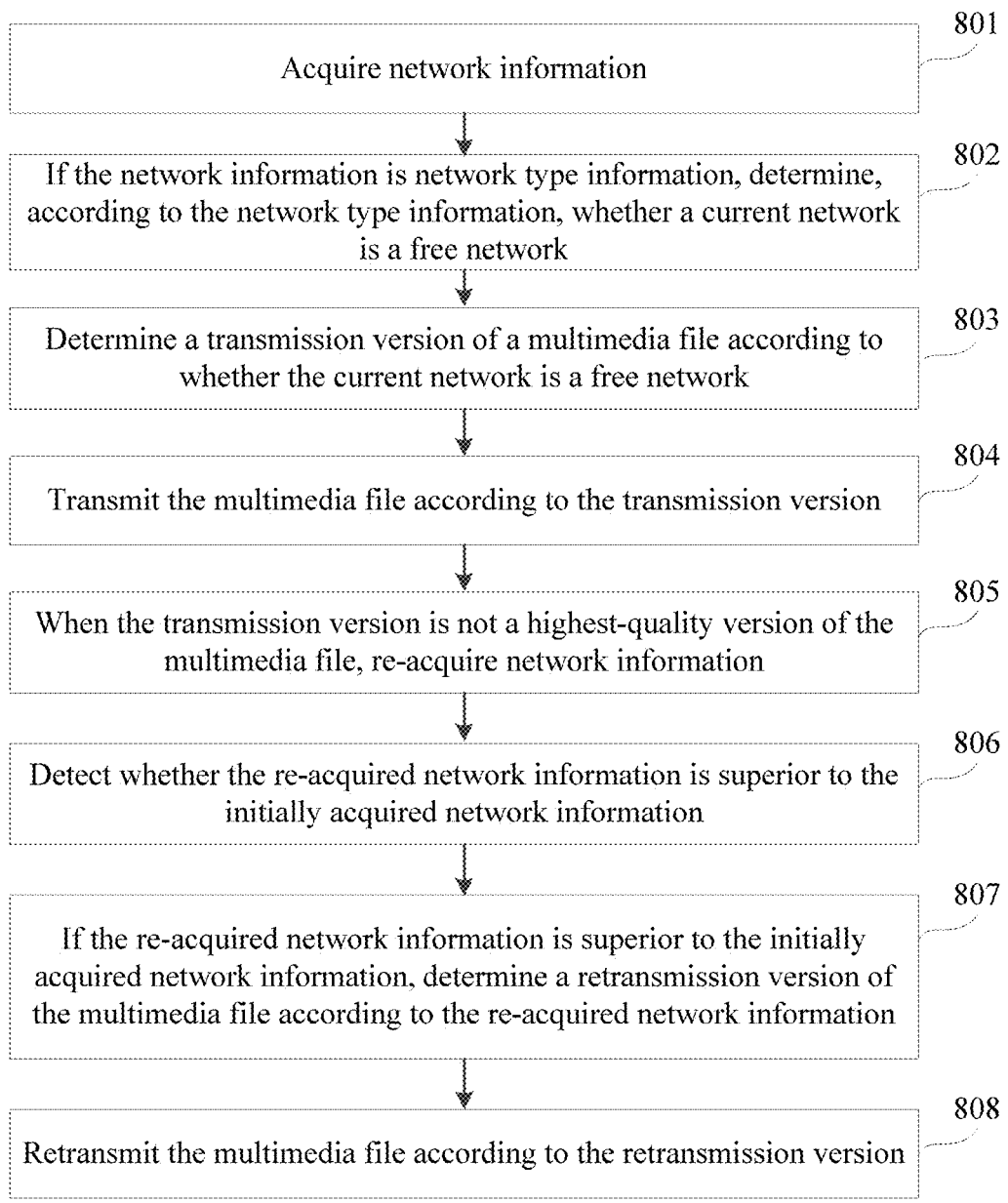
FIG. 8 is a method flowchart of a multimedia file transmission method according to yet another embodiment of the present disclosure.

Referring to FIG. 8, FIG. 8 shows a method flowchart of a multimedia file transmission method according to yet another embodiment of the present disclosure. This embodiment is described by using an example in which the multimedia file transmission method is applied at the sending terminal side, the server side, or the receiving terminal side in the implementation environment shown in FIG. 1. The multimedia file transmission method may include several steps as follows.

Step 801: Acquire network information.

An electronic device acquires the network information. The network information is any one of network status information, a peer end restrictive condition, and network type information. In this embodiment, that the network information is the network type information is used as an example. The network type information includes information such as a free network or a charging network.

Step 802: If the network information is network type information, determine, according to the network type information, whether a current network is a free network.

If the network information is the network type information, the electronic device determines, according to the network type information, whether the current network is a free network. The free network is generally a Wireless Fidelity (Wi-Fi) network, and the charging network is generally a cellular data network.

Step 803: Determine a transmission version of a multimedia file according to whether the current network is a free network.

The electronic device determines the transmission version of the multimedia file according to whether the current network is a free network.

1. If the current network is a free network, determine a highest-quality version of the multimedia file as the transmission version of the multimedia file.

When the current network is a free network, the electronic device determines the highest-quality version of the multimedia file as the transmission version of the multimedia file. Because a network currently accessed by the electronic device is a free network, it is unnecessary to consider a communications tariff problem of a user, and the highest-quality version of the multimedia file is directly transmitted.

2. If the current network is not a free network, process the highest-quality version of the multimedia file according to a preset multimedia file quality parameter to obtain a second target quality version, and determine the second target quality version as the transmission version of the multimedia file; or acquire remaining package data volume of the current network, determine a file size limit for current transmission according to the remaining package data volume, and determine the transmission version of the multimedia file according to the file size limit.

When the current network is not a free network, that is, the current network is a charging network, there are two possible implementation manners as follows.

First, the electronic device processes the highest-quality version of the multimedia file according to the preset multimedia file quality parameter to obtain the second target quality version, and determines the second target quality version as the transmission version of the multimedia file.

The preset multimedia file quality parameter may include parameters such as a multimedia file compression ratio, a definition conversion ratio, a saturation conversion ratio, a resolution conversion ratio, and a brightness conversion ratio. The electronic device may perform processing such as compression and conversion on the multimedia file according to the preset multimedia file quality parameter to obtain the second target quality version, and determine the second target quality version as the transmission version of the multimedia file. Multimedia file quality of the second target quality version is lower than multimedia file quality of the highest-quality version.

Second, the electronic device acquires the remaining package data volume of the current network, determines a file size limit for current transmission according to the remaining package data volume, and determines the transmission version of the multimedia file according to the file size limit.

The electronic device may further acquire remaining package data volume of a cellular data network, and then determine the file size limit for current transmission according to the remaining package data volume. For example, when the remaining package data volume is 1 M, 1 M may be determined as the file size limit for current transmission. Then, the electronic device determines the transmission version of the multimedia file according to the file size limit. For a step in which the electronic device determines the transmission version of the multimedia file according to the file size limit, reference may be made to step 603 in the embodiment shown in FIG. 6A and step 703 in the embodiment shown in FIG. 7, and details are not described herein again in this embodiment.

Step 804: Transmit the multimedia file according to the transmission version.

Step 805: When the transmission version is not a highest-quality version of the multimedia file, re-acquire network information.

Step 806: Detect whether the re-acquired network information is better than the initially acquired network information.

If both the re-acquired network information and the initially acquired network information are the network type information, the re-acquired network type information is compared with the initially acquired network type information, and if a result of a comparison between the network type information meets a second preset condition, it is determined that the re-acquired network information is better than the initially acquired network information, where the second preset condition includes that a charging network changes to a free network or the remaining package data volume is greater than a preset threshold.

For example, a network accessed by the electronic device changes from a cellular data network to a Wi-Fi network; for another example, the remaining package data volume is greater than a preset threshold of 20 M.

Step 807: If the re-acquired network information is better than the initially acquired network information, determine a retransmission version of the multimedia file according to the re-acquired network information.

Multimedia file quality corresponding to the retransmission version is higher than multimedia file quality corresponding to the transmission version.

When the network information is network type information, this step may include several substeps as follows.

First, determine, according to the network type information, whether a current network is a free network.

Second, determine the retransmission version of the multimedia file according to whether the current network is a free network.

1. If the current network is a free network, determine the highest-quality version of the multimedia file as the retransmission version of the multimedia file.

2. If the current network is not a free network, process the highest-quality version of the multimedia file according to a preset multimedia file quality parameter to obtain a fourth target quality version, and determine the fourth target quality version as the retransmission version of the multimedia file, where multimedia file quality of the fourth target quality version is higher than multimedia file quality of the second target quality version; or acquire remaining package data volume of the current network, determine a file size limit for retransmission according to the remaining package data volume, and determine the retransmission version of the multimedia file according to the file size limit.

Step 808: Retransmit the multimedia file according to the retransmission version.

The foregoing step 804 to step 808 are the same as or similar to step 604 to step 608 in the embodiment shown in FIG. 6A and step 704 to step 708 in the embodiment shown in FIG. 7, and details are not described herein again in this embodiment.

In conclusion, according to the multimedia file transmission method provided in this embodiment, network information is acquired, a transmission version of a multimedia file is determined according to the network information, and the multimedia file is transmitted according to the transmission version, where different transmission versions are corresponding to different multimedia file quality, which resolves a problem, existing in a multimedia file transmission solution involved in related technologies, that selection of a multimedia file quality version is not appropriate. Compared with the multimedia file transmission solution involved in the related technologies, in the multimedia file transmission method provided in this embodiment, the network information is automatically acquired, and the transmission version of the multimedia file is automatically determined according to the network information, which not only saves an operation of manually selecting, by a user, a transmission version and reduces operation complexity, but also improves appropriateness of determining a transmission version.

In addition, in this embodiment, that the network information is network type information is used as an example, and a solution of automatically determining the transmission version of the multimedia file according to the network type information is provided. Further, when the transmission version is not a highest-quality version of the multimedia file, network information is re-acquired, and when the re-acquired network information is better than the initially acquired network information, a high-quality retransmission version is determined according to the re-acquired network information, and the retransmission version is transmitted, so that a lower-quality transmission version can be automatically optimized. Therefore, according to the multimedia file transmission method provided in this embodiment, a communications tariff of the user is reduced, a degree of automation in multimedia file transmission is improved, an effect of quality optimization is achieved, and meanwhile, user experience is enhanced.

It should be understood that the singular form "one" ("a", "an", "the") used in this specification is intended to further include a plural form unless the context clearly supports an otherwise case. It should also be understood that "and/or" used this specification indicates that any or all possible combinations of one or more associated listed items are included.

The sequence numbers of the foregoing embodiments of the present disclosure are merely for illustrative purposes, and are not intended to indicate priorities of the embodiments.

A person of ordinary skill in the art may understand that all or a part of the steps of the embodiments may be implemented by hardware or a program instructing related hardware. The program may be stored in a computer-readable storage medium. The storage medium may include a read-only memory, a magnetic disk, or an optical disc.

The foregoing descriptions are merely exemplary embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. A multimedia file transmission apparatus, comprising:
a non-transitory computer readable medium having instructions stored thereon; and
a computer processor coupled to the non-transitory computer readable medium and configured to execute the instructions that cause the computer processor to:
acquire first network information of a network;
acquire a transmission time limit for a multimedia file;
calculate a transmission file size limit of the multimedia file according to the transmission time limit and the first network information;
determine a multimedia file transmission version from a plurality of transmission versions of the multimedia file according to the first network information and the transmission file size limit, wherein the transmission versions correspond to different multimedia file quality;
transmit the multimedia file of the multimedia file transmission version;
set a retransmission identifier for the multimedia file when the multimedia file transmission version of the multimedia file transmitted is not a highest-quality version, wherein the retransmission identifier is an indicator for retransmitting the multimedia file;
detect the retransmission identifier for the multimedia file after transmitting the multimedia file of the multimedia file transmission version;

monitor second network information of the network in response to detecting the retransmission identifier for the multimedia file;

determine a multimedia file retransmission version from the transmission versions of the multimedia file according to the second network information, wherein the multimedia file retransmission version comprises a higher-quality version of the multimedia file than the multimedia file transmission version; and retransmit the multimedia file using the multimedia file retransmission version so as to replace an entirety of the multimedia file with the multimedia file transmission version.

2. The multimedia file transmission apparatus of claim 1, wherein the instructions further cause the computer processor to be configured to perform one of the following three options:

(1) calculate the transmission file size limit according to network status information when the first network information is the network status information; and determine the multimedia file transmission version according to the transmission file size limit; or (2) calculate the transmission file size limit according to a peer end restrictive condition when the first network information is the peer end restrictive condition; and determine the multimedia file transmission version according to the transmission file size limit; or (3) determine, according to network type information, whether a current network is a free network when the first network information is the network type information; and determine the multimedia file transmission version based on whether the current network is a free network.

3. The multimedia file transmission apparatus of claim 2, wherein the transmission time limit is set by a system or set by a user.

4. The multimedia file transmission apparatus of claim 2, wherein the instructions further cause the computer processor to be configured to:

determine whether a file size of a highest-quality version of the multimedia file is greater than the transmission file size limit;

determine the highest-quality version of the multimedia file as the multimedia file transmission version when the file size of the highest-quality version of the multimedia file is less than the transmission file size limit;

process the highest-quality version of the multimedia file according to the transmission file size limit to obtain a first target quality version when the file size of the highest-quality version of the multimedia file is greater than the transmission file size limit; and determine the first target quality version as the multimedia file transmission version when the file size of the highest-quality version of the multimedia file is greater than the transmission file size limit, wherein a file size of the first target quality version is less than or equal to the transmission file size limit.

5. The multimedia file transmission apparatus of claim 2, wherein the instructions further cause the computer processor to be configured to:

read a file size limit from the peer end restrictive condition to obtain a read file size limit when the peer end restrictive condition comprises the file size limit;

determine the read file size limit as the transmission file size limit when the peer end restrictive condition comprises the file size limit;

read a multimedia file parameter limit from the peer end restrictive condition when the peer end restrictive condition comprises the multimedia file parameter limit;

determine the transmission file size limit according to the multimedia file parameter limit when the peer end restrictive condition comprises the multimedia file parameter limit, wherein the multimedia file parameter limit comprises at least one of a definition limit, a resolution limit, a saturation limit, and a brightness limit;

read peer end user association information from the peer end restrictive condition when the peer end restrictive condition comprises the peer end user association information; and determine the transmission file size limit according to the peer end user association information when the peer end restrictive condition comprises the peer end user association information.

6. The multimedia file transmission apparatus of claim 2, wherein the instructions further cause the computer processor to be configured to:

determine a highest-quality version of the multimedia file as the multimedia file transmission version when the current network is a free network;

process the highest-quality version of the multimedia file according to a preset multimedia file quality parameter to obtain a second target quality version when the current network is not the free network; and either determine the second target quality version as the multimedia file transmission version when the current network is not the free network or acquire remaining package data volume of the current network, determine the transmission file size limit for a current transmission according to the remaining package data volume, and determine the multimedia file transmission version according to the transmission file size limit when the current network is not the free network.

7. The multimedia file transmission apparatus of claim 1, wherein the instructions further cause the computer processor to be configured to acquire the second network information when the multimedia file transmission version is not a highest-quality version of the multimedia file, and wherein multimedia file quality corresponding to the multimedia file retransmission version is higher than multimedia file quality corresponding to the multimedia file transmission version.

8. The multimedia file transmission apparatus of claim 7, wherein the instructions further cause the computer processor to be configured to detect whether the second network information is better than the first network information.

9. The multimedia file transmission apparatus of claim 2, wherein the instructions further cause the computer processor to be configured to:

detect whether an extent to which a re-acquired network status information of the second network information is better than initially acquired network status information of the first network information exceeds a first preset threshold when both the second network information and the first network information are the network status information; and either (1): compare a re-acquired peer end restrictive condition with an initially acquired peer end restrictive condition when both the second network information and the first network information are the peer end restrictive conditions; and determine that the second network information is better than the first network information when the re-acquired peer end restrictive condition meets a first preset condition, wherein the first preset condition comprises that the initially acquired peer end restrictive condition either changes from a restricted state to a restriction released state or changes from a restricted state to a restriction relaxed state; or (2): compare a re-acquired network type information of the second network information with an initially acquired network type information of the first network information when both the second network information and the first network information are the network type information; and determine that the second network information is better than the first network information when the re-acquired network type information meets a second preset condition, wherein the second preset condition comprises that a charging network changes to a free network or a remaining package data volume is greater than a second preset threshold.

10. The multimedia file transmission apparatus of claim 7, wherein the instructions further cause the computer processor to be configured to perform one of the following three options:

(1): calculate a retransmission file size limit according to network status information when the second network information is the network status information; and determine the multimedia file retransmission version according to the retransmission file size limit; or (2): calculate the retransmission file size limit according to a peer end restrictive condition when the second network information is the peer end restrictive condition; and determine the multimedia file retransmission version according to the retransmission file size limit; or (3): determine, according to network type information, whether a current network is a free network when the second network information is the network type information; and determine the multimedia file retransmission version according to whether the current network is a free network.

11. The multimedia file transmission apparatus of claim 10, wherein the instructions further cause the computer processor to be configured to:

acquire the transmission time limit, wherein the transmission time limit is set by a system or set by a user of the apparatus; and calculate the retransmission file size limit for retransmission according to the transmission time limit and the network status information.

12. The multimedia file transmission apparatus of claim 10, wherein the instructions further cause the computer processor to be configured to:

determine whether a file size of the highest-quality version of the multimedia file is greater than the retransmission file size limit;

determine the highest-quality version of the multimedia file as the multimedia file retransmission version when the file size of the highest quality version of the multimedia file is less than the retransmission file size limit;

process the highest-quality version of the multimedia file according to the retransmission file size limit to obtain a third target quality version when the file size of the highest-quality version of the multimedia file is greater than the retransmission file size limit; and determine the third target quality version as the retransmission version of the multimedia file when the file size of the highest-quality version of the multimedia file is greater than the retransmission file size limit, wherein a file size of the third target quality version is less than or equal to the retransmission file size limit, and wherein multimedia file quality of the third target quality version is higher than multimedia file quality of a first target quality version.

13. The multimedia file transmission apparatus of claim 10, wherein the instructions further cause the computer processor to be configured to:

read a file size limit from the peer end restrictive condition to obtain a read file size limit when the peer end restrictive condition comprises the file size limit;

determine the read file size limit as the retransmission file size limit when the peer end restrictive condition comprises the file size limit;

read a multimedia file parameter limit from the peer end restrictive condition when the peer end restrictive condition comprises the multimedia file parameter limit;

determine the retransmission file size limit according to the multimedia file parameter limit when the peer end restrictive condition comprises the multimedia file parameter limit, wherein the multimedia file parameter limit comprises at least one of a definition limit, a resolution limit, a saturation limit, and a brightness limit;

read peer end user association information from the peer end restrictive condition when the peer end restrictive condition comprises the peer end user association information; and determine the retransmission file size limit according to the peer end user association information when the peer end restrictive condition comprises the peer end user association information.

14. The multimedia file transmission apparatus of claim 10, wherein the instructions further cause the computer processor to be configured to:

determine the highest-quality version of the multimedia file as the multimedia file retransmission version when the current network is a free network;

process the highest-quality version of the multimedia file according to a preset multimedia file quality parameter to obtain a fourth target quality version when the current network is not the free network; and either determine the fourth target quality version as the multimedia file retransmission version when the current network is not the free network, wherein multimedia file quality of the fourth target quality version is higher than multimedia file quality of a second target quality version; or acquire remaining package data volume of the current network, determine the retransmission file size limit according to the remaining package data volume, and determine the multimedia file retransmission version according to the retransmission file size limit when the current network is not the free network.

15. The multimedia file transmission apparatus of claim 7, wherein the instructions further cause the computer processor to be configured to:

detect whether there is, at a local end, a multimedia file for which the retransmission identifier is set; and perform the step of acquiring the second network information when a multimedia file for which the retransmission identifier is set exists.

16. The multimedia file transmission apparatus of claim 1, wherein the instructions further cause the computer processor to be configured to:

generate first prompt information when the multimedia file transmission version is not a highest-quality version of the multimedia file, wherein the first prompt information indicates that the multimedia file transmission version is not the highest-quality version of the multimedia file; and generate second prompt information when the multimedia file transmission version is the highest-quality version of the multimedia file, wherein the second prompt information indicates that the transmission version is the highest-quality version of the multimedia file.

17. The multimedia file transmission apparatus of claim 7, wherein the instructions further cause the computer processor to be configured to generate third prompt information, wherein the third prompt information indicates that the multimedia file quality of the multimedia file retransmission version is higher than the multimedia file quality of the multimedia file transmission version.

18. A multimedia file transmission method, comprising:
acquiring first network information of a network;
acquiring a transmission time limit for a multimedia file;
calculating a transmission file size limit of the multimedia file according to the transmission time limit and the first network information;
determining a multimedia file transmission version of a multimedia file from a plurality of transmission versions of the multimedia file according to the first network information and the transmission file size limit, wherein the transmission versions correspond to different multimedia file quality;
transmitting the multimedia file of the transmission version;
setting a retransmission identifier for the multimedia file when the multimedia file transmission version of the multimedia file transmitted is not a highest-quality version, wherein the retransmission identifier is an indicator for retransmitting the multimedia file;
detecting the retransmission identifier for the multimedia file after transmitting the multimedia file of the multimedia file transmission version;
monitoring second network information of the network in response to detecting the retransmission identifier for the multimedia file;
determining a multimedia file retransmission version from the plurality of transmission versions of the multimedia file according to the second network information, wherein the multimedia file retransmission version comprises a higher-quality version of the multimedia file than the multimedia file transmission version; and
retransmitting the multimedia file using the multimedia file retransmission version so as to replace an entirety of the multimedia file with the multimedia file transmission version.

19. The multimedia file transmission method of claim 18, wherein the transmission time limit is set by a system or set by a user.

20. The multimedia file transmission method of claim 18, wherein after transmitting the multimedia file according to the multimedia file transmission version, the method further comprises acquiring the second network information, wherein multimedia file quality corresponding to the multimedia file retransmission version is higher than multimedia file quality corresponding to the multimedia file transmission version.

21. The multimedia file transmission method of claim 20, wherein before determining the multimedia file retransmission version according to the second network information, the method further comprises detecting whether the second network information is better than the first network information.

22. The multimedia file transmission method of claim 21, wherein detecting whether the second network information is better than the first network information comprises:
detecting whether an extent to which a re-acquired network status information of the second network information is better than an initially acquired network status information of the first network information exceeds a first preset threshold when both the second network information and the first network information are the network status information;
comparing a re-acquired peer end restrictive condition with an initially acquired peer end restrictive condition when both the second network information and the first network information are the peer end restrictive conditions;
determining that the second network information is better than the first network information when the re-acquired peer end restrictive conditions meets a first preset condition, wherein the first preset condition comprises that the initially acquired peer end restrictive condition changes from a restricted state to a restriction released state or changes from a restricted state to a restriction relaxed state;
comparing a re-acquired network type information of the second network information with an initially acquired network type information of the first network information when both the second network information and the first network information are the network type information; and
determining that the second network information is better than the first network information when the re-acquired network type information meets a second preset condition, wherein the second preset condition comprises that a charging network changes to a free network or the remaining package data volume is greater than a second preset threshold.

23. The multimedia file transmission method of claim 20, wherein determining the multimedia file retransmission version according to the second network information comprises performing one of the following three options:
(1) calculating a file size limit for retransmission according to network status information when the second network information is the network status information; and
determining the multimedia file retransmission version according to the file size limit for retransmission; or
(2) determining a file size limit for retransmission according to a peer end restrictive condition when the second network information is the peer end restrictive condition; and
determining the multimedia file retransmission version according to the file size limit for retransmission; or
(3) determining, according to network type information, whether a current network is a free network when the first network information is the network type information; and
determining the multimedia file retransmission version according to whether the current network is a free network.

24. The multimedia file transmission method of claim 23, wherein calculating the file size limit for retransmission according to the network status information comprises:

acquiring a transmission time limit, wherein the transmission time limit is set by a system or set by a user; and
calculating the file size limit for retransmission according to the transmission time limit and the network status information.

25. The multimedia file transmission method of claim 23, wherein determining the retransmission version of the multimedia file according to the file size limit for retransmission comprises:
determining whether a file size of a highest-quality version of the multimedia file is greater than the file size limit for retransmission;
determining the highest-quality version of the multimedia file as the multimedia file retransmission version when the file size of the highest-quality version of the multimedia file is less than the file size limit for retransmission;
processing the highest-quality version of the multimedia file according to the file size limit for retransmission to obtain a third target quality version when the file size of the highest-quality version of the multimedia file is greater than the file size limit for retransmission; and
determining the third target quality version as the multimedia file retransmission version when the file size of the highest-quality version of the multimedia file is greater than the file size limit for retransmission, and
wherein a file size of the third target quality version is less than or equal to the file size limit for retransmission.

26. The multimedia file transmission method of claim 23, wherein determining the file size limit for retransmission according to the peer end restrictive condition comprises:
reading a file size limit from the peer end restrictive condition when the peer end restrictive condition comprises the file size limit;
determining the read file size limit as the file size limit for retransmission when the peer end restrictive condition comprises the file size limit;
reading a multimedia file parameter limit from the peer end restrictive condition when the peer end restrictive condition comprises the multimedia file parameter limit;
determining the file size limit for retransmission according to the multimedia file parameter limit when the peer end restrictive condition comprises the multimedia file parameter limit, wherein the multimedia file parameter limit comprises at least one of a definition limit, a resolution limit, a saturation limit, and a brightness limit;
reading peer end user association information from the peer end restrictive condition when the peer end restrictive condition comprises the peer end user association information; and
determining the file size limit for retransmission according to the peer end user association information when the peer end restrictive condition comprises the peer end user association information.

27. The multimedia file transmission method of claim 23, wherein determining the multimedia file retransmission version according to whether the current network is the free network comprises:
determining a highest-quality version of the multimedia file as the multimedia file retransmission version when the current network is the free network; and
either processing the highest-quality version of the multimedia file according to a preset multimedia file quality parameter to obtain a fourth target quality version, and determining the fourth target quality version as the multimedia file retransmission version when the current network is not the free network, wherein multimedia file quality of the fourth target quality version is higher than multimedia file quality of a second target quality version; or
acquiring remaining package data volume of the current network, determining a file size limit for retransmission according to the remaining package data volume, and determining the multimedia file retransmission version according to the file size limit for retransmission when the current network is not the free network.

28. The multimedia file transmission method of claim 20, wherein after transmitting the multimedia file according to the multimedia file transmission version, the method further comprises:
detecting whether there is, at a local end, a multimedia file for which the retransmission identifier is set; and
performing the step of acquiring the second network information when a multimedia file for which the retransmission identifier is set exists.

29. The multimedia file transmission method of claim 18, wherein after determining the multimedia file transmission version according to the first network information, the method further comprises:
generating first prompt information, wherein the first prompt information indicates that the multimedia file transmission version is not a highest-quality version of the multimedia file; or
generating second prompt information, wherein the second prompt information indicates that the multimedia file transmission version is the highest-quality version of the multimedia file.

30. The multimedia file transmission method of claim 20, wherein after determining the multimedia file retransmission version according to the second network information, the method further comprises generating third prompt information, and wherein the third prompt information indicates that the multimedia file quality of the multimedia file retransmission version is higher than the multimedia file quality of the multimedia file transmission version.

31. A multimedia file transmission method, comprising:
acquiring first network information of a network;
determining a multimedia file transmission version from a plurality of transmission versions of the multimedia file according to the first network information, wherein the transmission versions correspond to different multimedia file quality;
transmitting the multimedia file of the transmission version, wherein determining the multimedia file transmission version according to the first network information comprises:
determining a file size limit for a current transmission according to a peer end restrictive condition when the first network information is the peer end restrictive condition; and
determining the multimedia file transmission version according to the file size limit for the current transmission when the first network information is the peer end restrictive condition;
setting a retransmission identifier for the multimedia file when the multimedia file transmission version of the multimedia file transmitted is not a highest-quality version, wherein the retransmission identifier is an indicator for retransmitting the multimedia file;
detecting the retransmission identifier for the multimedia file after transmitting the multimedia file of the multimedia file transmission version;

monitoring second network information of the network in response to detecting the retransmission identifier for the multimedia file;

determining a multimedia file retransmission version from the plurality of transmission versions of the multimedia file according to the second network information, wherein the multimedia file retransmission version comprises a higher-quality version of the multimedia file than the multimedia file transmission version; and retransmitting the multimedia file using the multimedia file retransmission version so as to replace an entirety of the multimedia file with the multimedia file transmission version.

32. The multimedia file transmission method of claim 31, wherein determining the multimedia file transmission version according to the file size limit for the current transmission comprises:

determining whether a file size of a highest-quality version of the multimedia file is greater than the file size limit for the current transmission;

determining the highest-quality version of the multimedia file as the multimedia file transmission version when the file size of the highest-quality version of the multimedia file is less than the file size limit for the current transmission;

processing the highest-quality version of the multimedia file according to the file size limit for the current transmission to obtain a first target quality version when the file size of the highest-quality version of the multimedia file is greater than the file size limit for the current transmission; and determining the first target quality version as the multimedia file transmission version when the file size of the highest-quality version of the multimedia file is greater than the file size limit for the current transmission, wherein a file size of the first target quality version is less than or equal to the file size limit for the current transmission.

33. The multimedia file transmission method of claim 31, wherein determining the file size limit for the current transmission according to the peer end restrictive condition comprises:

reading a second file size limit from the peer end restrictive condition when the peer end restrictive condition comprises the second file size limit;

determining the read file size limit as the file size limit for the current transmission when the peer end restrictive condition comprises the file size limit;

reading a multimedia file parameter limit from the peer end restrictive condition when the peer end restrictive condition comprises the multimedia file parameter limit;

determining the file size limit for the current transmission according to the multimedia file parameter limit when the peer end restrictive condition comprises the multimedia file parameter limit, wherein the multimedia file parameter limit comprises at least one of a definition limit, a resolution limit, a saturation limit, and a brightness limit;

reading peer end user association information from the peer end restrictive condition when the peer end restrictive condition comprises the peer end user association information; and determining the file size limit for the current transmission according to the peer end user association information when the peer end restrictive condition comprises the peer end user association information.

\* \* \* \* \*